United States Patent
Hu et al.

(10) Patent No.: US 11,873,004 B2
(45) Date of Patent: Jan. 16, 2024

(54) METHOD AND SYSTEM FOR MOTION PLANNING FOR AN AUTONMOUS VEHICLE

(71) Applicants: Han Hu, Toronto (CA); Peyman Yadmellat, North York (CA)

(72) Inventors: Han Hu, Toronto (CA); Peyman Yadmellat, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 17/515,522

(22) Filed: Oct. 31, 2021

(65) Prior Publication Data
US 2022/0135068 A1 May 5, 2022

Related U.S. Application Data

(60) Provisional application No. 63/108,348, filed on Oct. 31, 2020.

(51) Int. Cl.
- *B60W 60/00* (2020.01)
- *G06N 3/08* (2023.01)

(52) U.S. Cl.
CPC ....... *B60W 60/001* (2020.02); *B60W 2552/00* (2020.02); *B60W 2554/40* (2020.02); *G06N 3/08* (2013.01)

(58) Field of Classification Search
CPC ........... B60W 60/001; B60W 2552/00; B60W 2554/40; G06N 3/08
See application file for complete search history.

(56) References Cited

U.S. PATENT DOCUMENTS

| | | |
|---|---|---|
| 2015/0345959 A1 | 12/2015 | Meuleau |
| 2016/0313133 A1 | 10/2016 | Zeng et al. |

(Continued)

FOREIGN PATENT DOCUMENTS

| | | |
|---|---|---|
| CN | 105606088 A | 5/2016 |
| CN | 111857160 A | 10/2020 |
| GB | 2331685 A | 5/1999 |

OTHER PUBLICATIONS

Dynamic Path Planning With Regular Triangulations Petr Broz, Michal Zemek, Ivana Kolingerov, Jakub Szkandera Faculty of Applied Sciences, University of West Bohemia, Pilsen, Czech Republic (Year: 2014).*

(Continued)

*Primary Examiner* — Peter D Nolan
*Assistant Examiner* — Mikko Okechukwu Obioha

(57) ABSTRACT

The present disclosure relates to methods and systems for generating a channel for use as a spatio-temporal constraint for motion planning for an autonomous vehicle. The method generates a triangulation mesh for a space in an environment. The triangulation mesh includes a plurality of nodes, each represents a geographic location in the space. Some of the nodes correspond to dynamic objects. Based on the triangulation mesh, a candidate channel extending from a starting location to a target location of the autonomous vehicle is generated. Further, the method predicts a time and location of a future triangulation mesh topology event caused by at least one of the nodes that will impact the candidate channel. A valid channel segment for the channel is selected, which extends from the starting location to a channel segment end location preceding the predicted location of the future triangulation mesh topology event. The channel improves the validity of motion planning for a longer time period.

17 Claims, 21 Drawing Sheets

(56) References Cited

U.S. PATENT DOCUMENTS

| | | | |
|---|---|---|---|
| 2019/0278293 A1* | 9/2019 | Levinson | G06T 17/20 |
| 2020/0200547 A1* | 6/2020 | Miller | G01C 21/3848 |
| 2020/0225622 A1* | 7/2020 | Buerkle | G01S 13/931 |
| 2022/0057803 A1* | 2/2022 | Sorin | G05D 1/0088 |
| 2022/0180578 A1* | 6/2022 | Peterson | G06T 7/10 |
| 2023/0041975 A1* | 2/2023 | Caldwell | G05B 13/0265 |

OTHER PUBLICATIONS

Cao, C. et al. "Dynamic Channel: A Planning Framework For Crowd Navigation". International Conference on Robotics and Automation (ICRA), Montreal, Canada https://arxiv.org/abs/1903.00143 May 2019.

Yan, H. et al. "Path planning based on Constrained Delaunay Triangulation," 7th World Congress on Intelligent Control and Automation, Chongqing, China 2008.

Vomacka, T. et al. "Computation of Topologic Events in Kinetic Delaunay Triangulation using Sturm Sequences of Polynomials." 2008.

Guibas, L. et al. "Primitives for the manipulation of general subdivisions and the computation of Voronoi" ACM Transactions on Graphics, vol. 4, No. 2 (pp. 74-123) Apr. 1985.

Edelsbrunner, H. "CPS230: Design and Analysis of Algorithms", Duke University, Lecture Notes, pp. 77-80, Fall 2008.

Petr Broz et al., Dynamic Path Planning With Regular Triangulations, Machine Graphics and Vision2014, vol. 23, No. 3/4, total 24 pages. 2014.

\* cited by examiner

Algorithm 1: Compute Topological Event Time

Input: $c_i$, res
Output: $\tau_{i+1}$                                    602A def vertices(*triangle*):
    return *vertices of triangle* def getETA(*triangle*):                                 ⟵ 604
    return $t_{eta}$ def getNeighbors(*triangle*):
    return *All vertices of the adjacent triangles that are not also vertices of triangle*   ⟵ 606 def dynamicModel(*p1, p2, p3, p4, t*):
    return *position of input points at time t*         ⟵ 608 def incircleTest(*a, b, c, p*):
    return $\gamma < 0$ def main($c_i$, *res*):
    for *triangle* in $c_i$ do
        a, b, c = vertices(*triangle*)  604
        $t_{eta}$ = getETA(*triangle*)
        for *p* in getNeighbors(*triangle*) do
            for $\tau$ in range(0, $t_{eta}$, *res*) do
                a, b, c, p = dynamicModel(*a, b, c,*         606
                    *p, $\tau$*)
                if incircleTest(*a, b, c, p*) then    608
                    return $\tau$
    return None

FIG. 6B

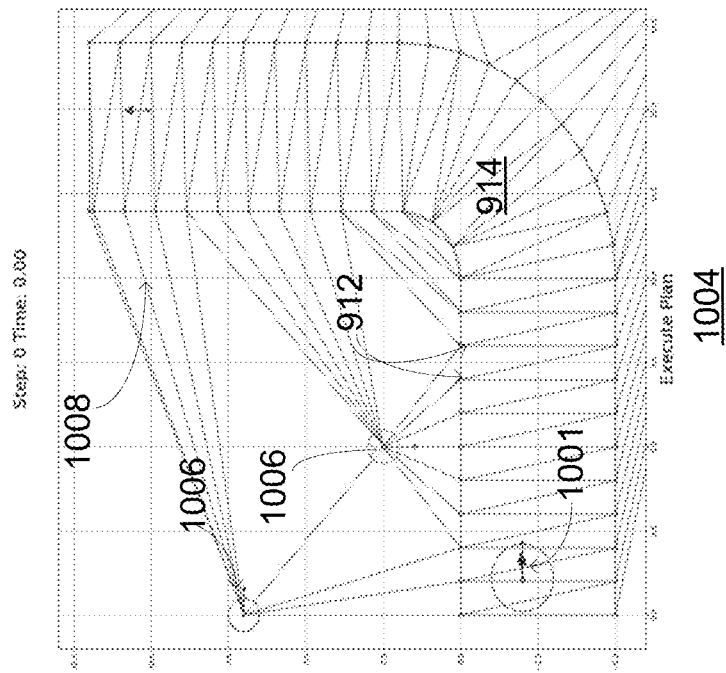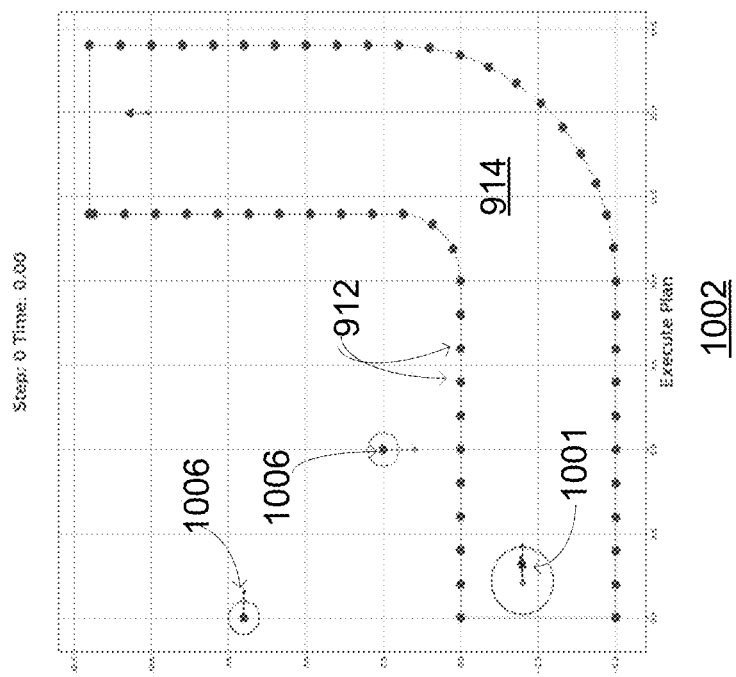
FIG. 10A

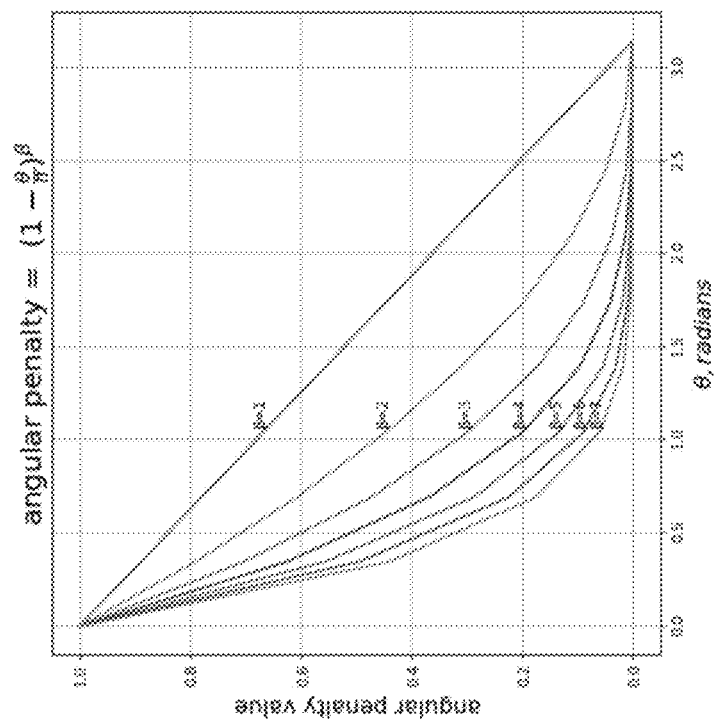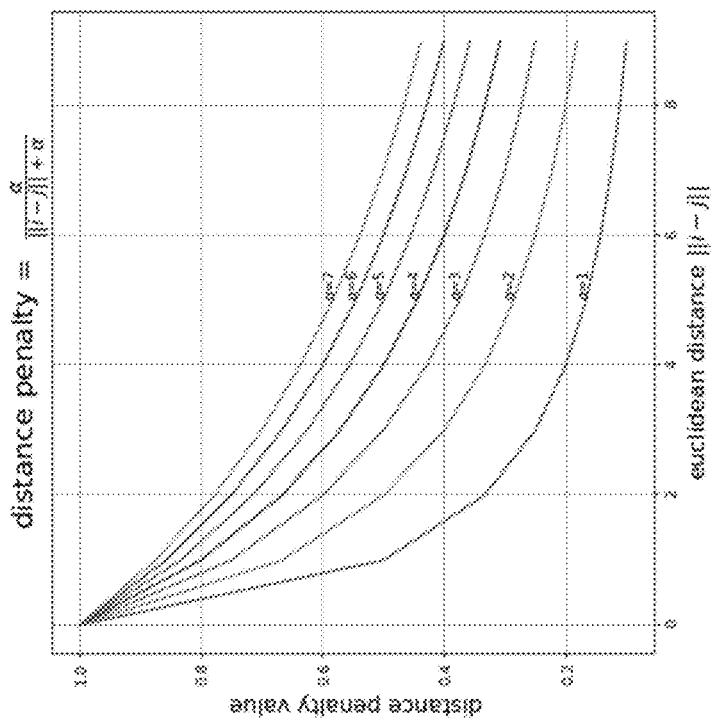
FIG. 12

METHOD AND SYSTEM FOR MOTION PLANNING FOR AN AUTONMOUS VEHICLE

PRIORITY CLAIM

This application claims priority to U.S. Provisional Patent Application No. 63/108,348, filed Oct. 31, 2020, titled "METHOD AND SYSTEM FOR MOTION PLANNING," which is herein incorporated by reference.

TECHNICAL FIELD

The present disclosure relates to autonomous vehicles, and more specifically, to a method and system for motion planning for autonomous vehicles.

BACKGROUND

Motion planning for an autonomous vehicle in a dynamic environment is challenging engineering problem. Motion planning often requires spatial constraints (e.g., road lane boundaries such as centerlines and road edge lines) provided by semantic maps to generate a trajectory. This requirement results in motion planning failure when the spatial constraints are absent or invalid, which may occur, for example, in the case of an unmapped road, an unstructured open area, congested traffic, a partially obstructed single lane, etc.

A common method to generate a spatial constraint is to represent an environment with a triangulation mesh and find a channel within the triangulation mesh. The channel is used as the generated spatial constraint. A triangulation mesh is a mesh of triangles covering a space, and these triangles are generated and connected together based on criteria (mesh topology). Each triangle in the triangulation mesh has three nodes, and each node in a triangle may represent a geographic location of a static object or a dynamic object in the environment at a given time. A channel is found by searching through the triangulation mesh from a starting location corresponding to a starting triangle to a target location corresponding to a target tringle to find a sequence of connected and collision-free triangles, which connect the starting triangle to the target triangle. The channel is then used as a spatial constraint for motion planning. Most known methods for motion planning that use a triangulation mesh method to generate spatial constraints for motion planning ignore the temporal dependencies of the spatial constrains resulting from a dynamic environment (i.e. known methods assume an environment is static, and such methods rely on repeated re-planning to handle dynamic objects). Known triangulation mesh methods may, for example, rely on one or both of 1) repeatedly updating the triangulation mesh of the environment to account for changes in the environment and/or 2) using incremental or anytime variant search algorithms for re-planning, or a combination of both. These known triangulation mesh methods can be inflexible to changes in the environment. A first limitation of known triangulation mesh methods is that they do not consider masked dynamic nodes and only consider the interaction between adjacent nodes, which is a natural approach that takes the advantage of triangulation mesh graph connectivity. However, this causes motion information of non-adjacent dynamic nodes to be masked by the nodal connectivity of adjacent static or dynamic nodes, hence ignoring the motion information of all non-adjacent dynamic nodes. A second limitation is an invariant topology assumption, such that the nodal connectivity of a triangulation mesh (i.e. connectivity of nodes in triangles of the triangulation mesh) is assumed to be invariant over time. For example, a channel found based on the triangulation mesh topology at one point in time may not remain valid at a different point in time. This is because some of the nodal connectivity that forms the channel may no longer exist when the topology of the triangulation mesh changes. Motion planning based on an invalid channel can result in a near-sighted motion planning, which can lead an autonomous vehicle into unfavorable situations, such as motion planner failures, sudden stops, and unrecoverable states. Combined, these limitations result in volatile and near-sighted motion planning, which is unsuitable for autonomous vehicles.

Accordingly, motion planning methods and systems that address these and other limitations of existing triangulation mesh methods are needed.

SUMMARY

The present disclosure describes example methods and systems for motion planning for an autonomous vehicle. The disclosed methods and systems for motion planning use an improved triangulation mesh method to generate a channel that is used as a spatial or spatio-temporal constraints in situations where spatial or spatio-temporal constraints are absent. The methods and systems generate a channel, which may be a collision-free channel, consisting of a sequence of valid channel segments. The channel is used as spatial or spatio-temporal constraints for motion planning for an autonomous vehicle. The channel begins at a starting location and extends to a target location of the autonomous vehicle.

According to a first example aspect, a computer-implemented method is provided for generating a channel which is used as spatial or spatio-temporal constraints for motion planning for an autonomous vehicle. The method includes generating a triangulation mesh for a space in an environment of the autonomous vehicle, the triangulation mesh comprising a plurality of nodes that each represent a geographic location in the space at a given time, at least some of the nodes corresponding to moving objects in the space. The method also includes generating, based on the triangulation mesh, a candidate channel through the space that the autonomous vehicle can pass through, the candidate channel comprising a series of adjacent triangles of the triangulation mesh that extend from a starting location to a target location of the autonomous vehicle. The method also includes generating the channel by iteratively: predicting, based on motion information for the dynamic nodes, a time and location of a future triangulation mesh topology event caused by at least one of the nodes that will impact the candidate channel; and selecting, as a valid channel segment for the channel, a portion of the candidate channel that extends from the starting location to a channel segment end location preceding the predicted location of the future triangulation mesh topology event. The method provides the channel for motion planning for the autonomous vehicle.

In the preceding aspect of the computer-implemented method, selecting the portion of the candidate channel may include predicting a location for the autonomous vehicle in the candidate channel for the time of the future triangulation mesh topology event, determining an anchor triangle from the candidate channel based on the predicted location of the autonomous vehicle, where the channel segment end location is the anchor triangle.

In the preceding aspect of the computer-implemented method, the anchor triangle may correspond to the predicted location of the autonomous vehicle when the predicted location of the autonomous vehicle is located at a triangle preceding the predicted location of the future triangulation mesh topology event, and the anchor triangle may correspond to a triangle immediately preceding a triangle that corresponds to the predicted location of the autonomous vehicle when the predicted location of the autonomous vehicle is located at the predicted location of the future triangulation mesh topology event.

The computer-implemented method of any of the preceding aspects may include generating virtual static nodes and including the virtual static nodes in the triangulation mesh to limit the space to a region the channel can be generated for.

In any of the preceding aspects of the computer-implemented method, the candidate channel may be generated using a graph search method of at least one or more of Anytime A*, D* lite, or Timed A*.

According to a further example aspect, there is provide a computer-implemented method for motion planning. The method includes: generating a candidate channel by constructing a triangulation mesh representing an environment based on locations of static objects and dynamic objects in the environment, the triangulation mesh consisting of a plurality of triangles covering the candidate channel, each triangle comprising three nodes, each node corresponding to one of the static or dynamic objects. The method includes identifying a sequence of valid channel segments within the candidate channel, the sequence valid channel segments extending from a starting location of the autonomous vehicle to a target location of the autonomous vehicle, and generating a channel comprising the identified sequence of valid channel segments. Each valid channel segment is identified by: determining a location and time for a topological event impacting the candidate channel that is closest to the starting location; predicting the location of the autonomous vehicle when the topological event occurs; and identifying an anchor triangle in the triangulation mesh corresponding to the location of the autonomous vehicle at the time of topological event, the anchor triangle being a triangle splitting the candidate channel into the valid channel segment and a non-valid channel segment, wherein the valid channel segment is a portion of the candidate channel from the starting location to the anchor triangle or a triangle before the anchor triangle. The method further motion plans for an autonomous vehicle using at least the channel as spatial or spatio-temporal constraints The computer-implemented method may further include, for each respective node corresponding to a dynamic object, projecting a velocity of the dynamic object onto edges of one or more neighboring nodes of the respective node.

In any of the preceding aspects of the computer-implemented method, the projection of the velocity of each node corresponding to a dynamic object may be a function of a velocity value, a distance penalty, and an angular penalty, wherein a value of the projection of each one of the edges is the vector multiplication between the velocity value of the node and a direction of each one of the edges multiplied by the angular penalty and the distance penalty, computed separately for each edge.

In any of the preceding aspects of the computer-implemented method, the distance penalty is computed as distance penalty=$\alpha/\|i-j\|+\alpha'$ wherein $\alpha$ is a distance penalty factor, $\|i-j\|$ is the Euclidean distance between i and j, wherein i and j are the coordinates of one of the plurality of nodes and a point of interest.

In any of the preceding aspects of the computer-implemented method, the angular penalty may be computed as angular penalty=$(1-\theta/\pi)^\beta$, wherein $\theta$ is the angle between each one edge of the one node and the direction of the one node, and $\beta$ is an angular penalty factor.

In any of the preceding aspects of the computer-implemented method, generating a plurality of evenly spaced virtual static nodes for the candidate channel, and placing the plurality of evenly spaced virtual static nodes on a perimeter of the candidate channel and reconstructing the triangulation mesh.

In any of the preceding aspects of the computer-implemented method, the topological events are determined by predicting locations of the nodes corresponding to the dynamic objects at points in time, and computing if any one of the nodes corresponding to the dynamic objects at the points in time causes a triangulation mesh violation to any one of the triangles in the triangulation mesh of the channel, wherein the points in time when violations occur are the times of topological events.

In any of the preceding aspects of the computer-implemented method, the triangulation mesh is constructed using at least one of Delaunay triangulation or constrained Delaunay triangulation.

In any of the preceding aspects of the computer-implemented method, the locations of the nodes are predicted using at least one of mathematical models including linear or non-linear models; statistical models including Kalman filters, particle filters, or regression; or machine learning-based models including support vector machine for regression, decision trees, distributional learning, variational inference, and a neural network.

In a further example aspect, there is disclosed a computing system comprising: a processor; a memory coupled to the processor, the memory tangibly storing thereon executable instructions that, when executed by the processor, cause the processor to perform any of the preceding computer-implemented methods.

BRIEF DESCRIPTION OF THE DRAWINGS

Reference will now be made, by way of example, to the accompanying drawings which show example embodiments of the present application, and in which:

FIG. 6B shows a pseudocode representation of a compute topological event time algorithm that is performed by compute event time module of the topological event predictor module;

FIG. 10A shows an example of triangulation mesh generation by a mesh generator in accordance with one example embodiment of the present disclosure;

FIG. 12 shows graphs of velocity projection penalties in accordance with an example embodiment of the present disclosure;

DESCRIPTION OF EXAMPLE EMBODIMENTS

Figure 1:
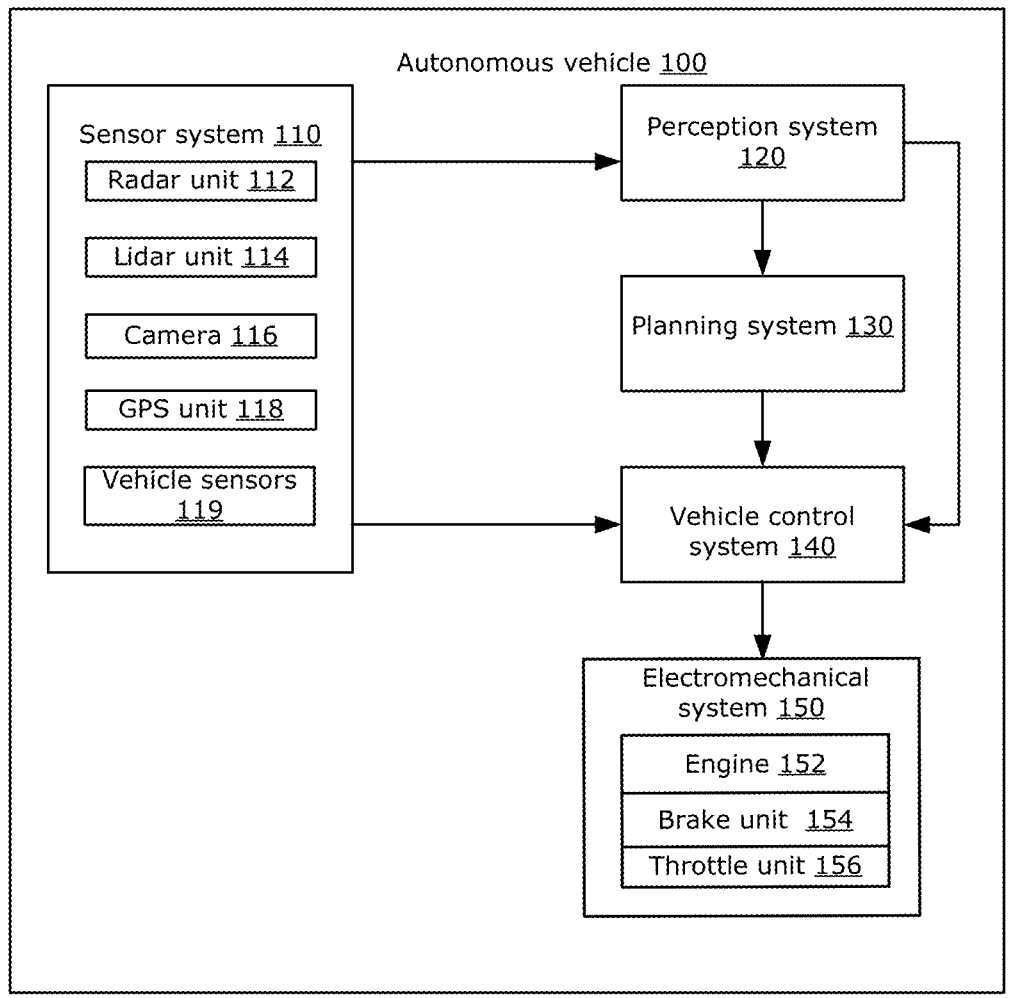
FIG. 1 is a block diagram illustrating selected components and systems of an autonomous vehicle according to example embodiments.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices do not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed-function hardware, other devices may implement such functions in a programmable processor with code obtained from a machine-readable medium.

Examples of the present disclosure are described in the context of motion planning for autonomous vehicles. Although examples described herein may refer to a car or automobile as the autonomous vehicle, the teachings of the present disclosure may be implemented in other forms of autonomous or semi-autonomous vehicles, including, for example, trams, subways, trucks, buses, surface and submersible watercraft and ships, aircraft, drones (also referred to as unmanned aerial vehicles (UAVs)), warehouse equipment, manufacturing facility equipment, construction equipment, farm equipment, autonomous service robots such as vacuum cleaners and lawnmowers, and other robotic devices. Autonomous vehicles may include vehicles that do not carry passengers as well as vehicles that do carry passengers.

Example embodiments of systems and methods for motion planning for autonomous vehicle are disclosed. In at least some applications, the disclosed systems and methods may mitigate the masked dynamic node and invariant topology assumption limitations noted above. In this regard, a planning system is disclosed that is configured to generate a sequence of valid channel segments across different triangulation mesh topologies, forming a channel, which is used as spatial or spatio-temporal constraints for motion planning. In at least some applications, this may enable a stable, long-term motion planning in a dynamic environment. In example embodiments, the planning system estimates (or predicts) changes in the triangulation mesh topology and adapts to the changes in the triangulation mesh topology by generating and connecting a sequence of channel segments corresponding to different time intervals. The time intervals are determined based on the estimated (or predicted) topological changes in the triangulation mesh. The sequence of channel segments forms a channel which can be used as a spatial or spatial-temporal constraints for motion planning. In some example embodiments, a preprocessing step is applied to transmit motion information of dynamic nodes along the triangulation edges. By doing so, distant dynamic nodes will not be completely masked when only considering the interaction between adjacent nodes. In some examples, the disclosed system and method can be applied as a preprocessor to generate spatial constraints as inputs or to prune candidate trajectories generated by a motion planner. The disclosed system and method can also be employed for mission planning to find a global route or safeguard by a behavior planner against semantic map failures that may be caused by dynamic changes in a sematic map (e.g. road obstruction and construction zones).

Figure 2:
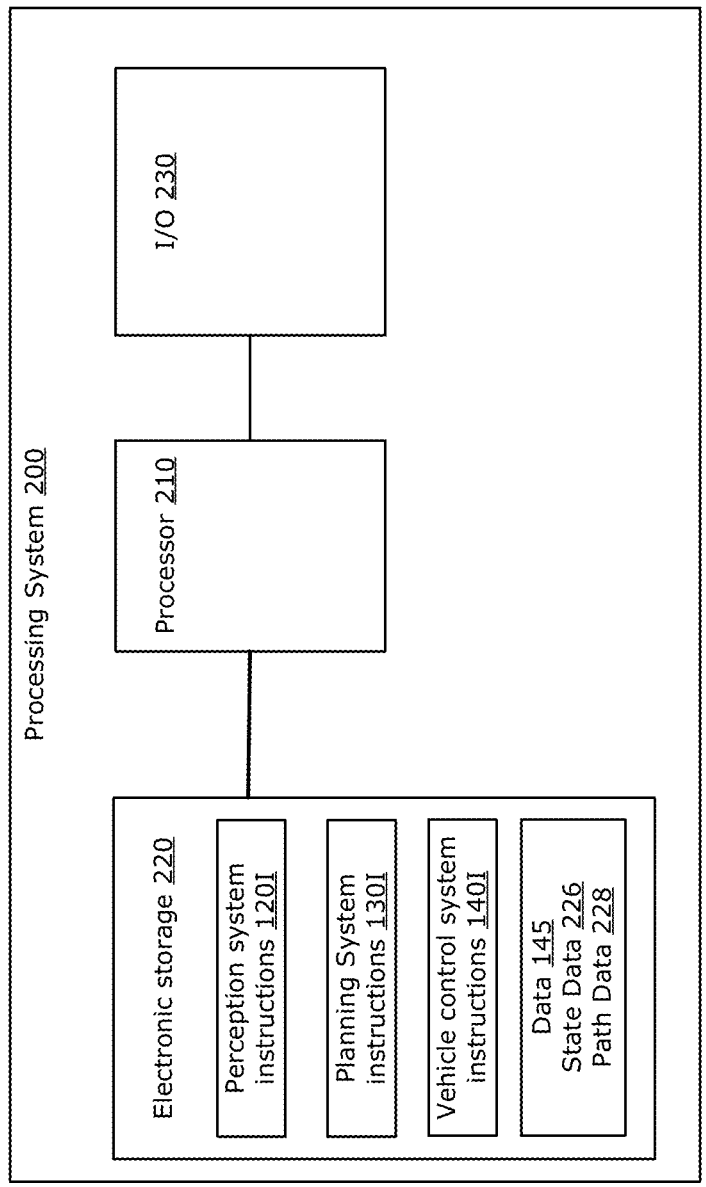
FIG. 2 is a block diagram illustrating a processing system that may be used to implement one or more systems of the autonomous vehicle of FIG. 1, including a motion planning system, in accordance with one example embodiment of the present disclosure.

Referring to FIG. 1 and FIG. 2, components and systems of an example autonomous vehicle 100 are illustrated. Although described as autonomous, the vehicle 100 may be operable in a fully-autonomous, semi-autonomous or fully user-controlled mode. In the present disclosure, the vehicle 100 is described in the embodiment of an automobile, such as a car; however, the present disclosure may be implemented in other autonomous vehicles, as discussed above.

The vehicle 100 includes a sensor system 110, a perception system 120, a planning system 130, a vehicle control system, 140 and an electromechanical system 150, for example.

The perception system 120, the planning system 130, and the vehicle control system 140 in this example are distinct software-enabled systems that are part of an automated driving system (ADS) of the vehicle 100. In example embodiments, one or more of the perception system 120, planning system 130 and the vehicle control system 140 are implemented using respective sets of machine-readable instructions 120I, 130I and 140I that are executable by one or more processors in a processing system 200 (FIG. 2) of the vehicle 100. Alternatively, the perception system 120, the planning system 130, and the vehicle control system 140 may be implemented as one or more chips (e.g., application-specific integrated circuit (ASIC), field-programmable gate array (FGPA), and/or other types of system on chip). Accordingly, as used herein, terms such as "system" and "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. In some examples, a "system" and a "module" can refer to a suitably configured hardware processing circuit.

Various systems and components of the vehicle 100 may communicate with each other, for example, through wired or wireless communication. For example, the sensor system 110 may communicate with the perception system 120 and the vehicle control system 140; the perception system 120 may communicate with the planning system 130 and the vehicle control system 140; the planning system 130 may communicate with the vehicle control system 140; and the vehicle control system 140 may communicate with the electromechanical system 150.

Referring again to FIG. 1, example flows of data (indicated by arrows) from the sensor system 110 to the perception system 120, to the planning system 130, to the vehicle control system 140, and to the electromechanical system 150 are illustrated. However, it should be understood that data may be communicated among the systems 110, 120, 130, 140, 150 in various different ways, and there may be two-way data communication among the systems 110, 120, 130, 140, 150.

The sensor system 110 includes various sensing units, such as a radar unit 112, a Light Detection and Ranging (LIDAR) unit 114, and a camera unit 116, for collecting information about an environment surrounding the vehicle 100 as the vehicle 100 operates in the environment. The sensor system 110 also includes a global positioning system (GPS) unit 118 to collect information about a vehicle's location in the environment. The sensor system 110 also includes one or more vehicle sensors 119 for collecting information about the physical operating conditions of the vehicle 100 itself, including, for example, sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, etc. Other sensors not shown in FIG. 1 may be included in the sensor system 110, such as environmental sensors for sensing external conditions such as external temperature and pressure, precipitation, and noise, among other possibilities.

Information collected by the sensor system 110 about the environment surrounding the vehicle 100 is provided as environmental sensor data to the perception system 120. Information collected by the sensor system 110 about the physical operating conditions of the vehicle 100 is provided as vehicle sensor data to the perception system 120. The perception system 120 processes the vehicle sensor data and environmental sensor data to generate state data 226. State data 226 may include data about the operating state of the vehicle, data about the geographical location of the vehicle, and data about the state of the environment surrounding the vehicle 100. State data 226 about the operating state of the vehicle 100 may include data about operating conditions of the vehicle, such as linear speed and acceleration, travel direction, angular acceleration, pose (e.g., pitch, yaw, roll), and vibration, and mechanical system operating parameters such as engine RPM, throttle position, brake position, and transmission gear ratio, etc.). State data 226 defining a vehicle location may include data about a geographical position of the vehicle 100, which may be in absolute geographical longitude/latitudinal values and/or values that reference other frames of reference. State data 226 about the state of the environment surrounding the vehicle 100 may include, for example, information about detected stationary and moving objects around the vehicle 100, weather and temperature conditions, road conditions, road configuration and other information about the physical environment.

State data 226 may also include predetermined vehicle parameters such as kinodynamic parameters. Generally, the term kinodynamics relates to a class of problems in robotics and motion planning, in which velocity, acceleration, and force/torque bounds must be satisfied and where kinematic constraints (e.g., obstacle avoidance) must also be satisfied. Kinodynamic parameters are those parameters, such as described above, that are relevant to this type of motion planning problem. In some embodiments, kinodynamic parameters may include one or more of: a maximum acceleration, a maximum deceleration, a maximum rotation speed of the steering wheel of the vehicle 100, a kinematic model of the vehicle 100, a width and/or length of the vehicle 100, a minimum turning radius, and so on.

In some examples, the sensor system 110 or the perception system 120 may also have access to a map, a reference or semantic map representing known information about the surrounding environment. For example, the map may be received from an internal or external reference database (e.g., retrieved based on the vehicle's position, as determined using the GPS unit 118).

In example embodiments, sensor data received from the radar, LIDAR and camera units 112, 114, 116 may be used by perception system 120 (and/or other systems) to determine the local environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). Sensor data from GPS unit 118 and other sensors may be used to determine the vehicle's location, defining a geographic position of the vehicle 100. Sensor data from vehicle sensors 119 and other sensor units may be used to determine the vehicle's operating parameters, including speed and pose of the vehicle 100 relative to a frame of reference.

The perception system 120 in the present disclosure is described as a general system that performs various sensing and processing functions. In some implementations, the perception system 120 may be implemented using various subsystems for performing different functions. For example, the perception system 120 may provide the functions of sensing, sensor fusion, localization, semantic understanding, object detection and tracking, and/or processing a world mode, among others. In some practical implementations, some of these functions may be implemented using different subsystems (e.g., a fusion subsystem or a state estimator subsystem) within the perception system 120. The present disclosure refers to the perception system 120 in general, for simplicity and without loss of generality. The data, including state data 226, outputted by the perception system 120 may include data that is minimally processed (e.g., normalized and/or filtered to remove noise). The perception system 120 may also perform more extensive processing of the sensor data, for example, to generate an Occupancy Grid Map (OGM) and predicted future OGMs, to detect and classify objects of interest (e.g., other vehicles, pedestrians, etc.), to detect position and speed of objects categorized by their class, to detect road lane markings and the position of the center of the lane, etc. Thus, the data outputted by the perception system 120 may include both analyzed (or estimated) data (e.g., OGMs and object classifications) as well as simple data (e.g., vehicle speed, vehicle acceleration, etc.).

The state data 226 is outputted from the perception system 120 in real-time to the planning system 130, which is the focus of the current disclosure and will be described in greater detail below. The vehicle control system 140 serves to control the operation of the vehicle 100 based on target objectives set by the planning system 130. The vehicle control system 140 may be used to provide full, partial or assistive control of the vehicle 100. The electromechanical system 150 receives control signals from the vehicle control system 140 to operate the electromechanical components of the vehicle 100 such as an engine, transmission, steering system and braking system.

As mentioned previously, the perception system 120, planning system 130 and the vehicle control system 140 may be implemented by respective sets of software instructions 120I, 130I and 140I that include machine-readable instructions that are executable by one or more processing units of a processing system of the vehicle 100.

FIG. 2 illustrates an example of a processing system 200 that may be included in the vehicle 100. The processing system 200 includes one or more processors 210. The one or more processors 210 may include a central processing unit (CPU), a graphical processing unit (GPU), a tensor processing unit (TPU), a neural processing unit (NPU), a digital signal processor or other computational elements. The processor(s) 210 are coupled to an electronic storage 220 and to one or more input and output (I/O) interfaces 230 to enable the vehicle control system 140 to send control signals to the electromechanical system 150 of the vehicle 100 to operate the electromechanical components (e.g. steering in the engine 152, brake in the brake unit 154, throttle in the throttle unit 156 of the vehicle 100). The electronic storage 220 can include one or more non-transient or tangible memories (for example, flash memory) and/or transient memories (for example, RAM). The tangible memory(ies) may store instructions, data and/or software modules for execution by the processor(s) 210 to carry out the functions of the systems described herein. The tangible memory(ies) of the electronic storage 220 may store other software instructions and data for implementing other operations of the vehicle 100.

The electronic storage 220 may include any suitable volatile and/or non-volatile storage and retrieval device(s), including, for example, flash memory, random access memory (RAM), read-only memory (ROM), hard disk, optical disc, subscriber identity module (SIM) card, memory stick, secure digital (SD) memory card, and other state storage devices. In the example of FIG. 2, the electronic storage 220 of the processing system 200 stores instructions 120I, 130I and 140I (executable by the processor(s) 210) for implementing the perception system 120, the planning system 130, and the vehicle control system 140. In some embodiments, the electronic storage 220 also stores data in data module 145, including state data 226 (e.g., derived from environmental sensor data and vehicle sensor data provided by the sensor system 110) and data utilized by the planning system 130 to generate a driving plan, such as maps for the current environment and data generated by the planning system 130 such as path data 228.

Figure 3:
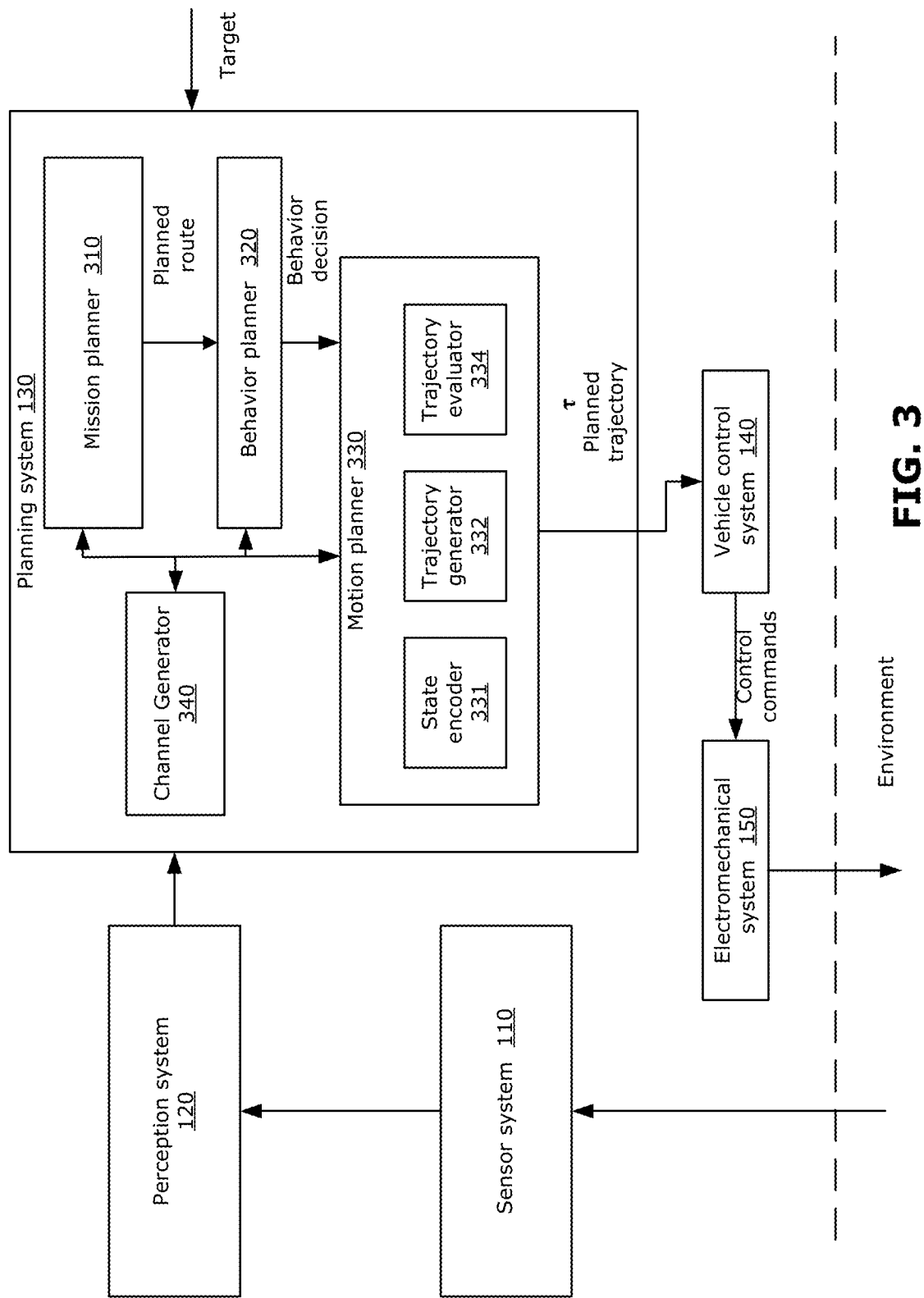
FIG. 3 is a block diagram illustrating further details of an example motion planning system in accordance with one example embodiment of the present disclosure.

FIG. 3 is a block diagram that illustrates further details of the planning system 130. Some components of the vehicle 100 have been omitted for clarity. It should be understood that, in some examples, components, modules or subsystems of the perception and/or planning systems may implement machine learning models that may be trained using processing systems external to the vehicle 100 (e.g., a server, physical machine(s) and/or virtual machine(s) provided by a cloud computing provider or a data center, or a simulator).

In example embodiments, planning system 130 performs planning and decision making at three levels, namely at the mission level (e.g., performed by the mission planner 310), at the behavior level (e.g., performed by the behavior planner 320), and at the motion level (e.g., performed by the motion planner 330).

In example embodiments, the planning system 130 includes a channel generator 340 that is configured to a sequence of valid channel segments that form a channel which are spatial or spatio-temporal constraints that can be used by one or more of the mission planner 310, behavior planner 320, and motion planner 330 when performing respective planning and decision-making.

Generally, planning and decision making is to determine a path for the vehicle 100 to travel from a starting location (e.g., the vehicle's current location and orientation, or an expected future location and orientation) to a final target location (e.g., a final destination defined by the user). Planning and decision making may also include determining one or more path segments (e.g., sub-paths) within the determined path to one or more intermediate target positions along the path. The planning system 130 performs planning and decision making to determine the appropriate path and path segments with consideration of conditions such as the drivable areas (e.g., defined roadway), obstacles (e.g., pedestrians and other vehicles), traffic regulations (e.g., obeying traffic signals) and user-defined preferences (e.g., avoidance of toll roads).

Planning and decision-making performed by the planning system 130 may be dynamic and be repeatedly performed as the environment changes. Changes in the environment may be due to the movement of vehicle 100 (e.g., vehicle 100 approaches a newly-detected obstacle) and the dynamic nature of the environment (e.g., moving pedestrians and other moving vehicles).

As mentioned above, planning and decision-making may be performed at different levels, such as at the mission, behavior, and motion levels. Mission level planning is considered a higher (or more global) level of planning, motion level planning is considered to be a lower (or more localized) level of planning and decision making, and behavior level planning is considered between mission and motion level. Generally, the output of planning and decision making at a higher level may form at least part of the input for a lower level of planning and decision making.

Planning at the mission level (more simply referred to as mission planning) relates to planning an overall path between a starting location and a target location for the autonomous vehicle at a high, or global, level. The starting location of the vehicle 100 may be the starting point of the journey (e.g., the user's home), and the target location of the vehicle 100 may be the final destination point (e.g., the user's workplace). Selecting a route to travel through a set of roads is an example of mission planning. Generally, the final destination point, once set (e.g., by user input) is unchanging through the duration of the journey. Although the target location may be unchanging, the path planned by mission planning may change through the duration of the journey. For example, changing traffic conditions may require mission planning to dynamically update the planned path to avoid congested roads. The user may also change the target location at any time during the journey.

Input data for mission planning may include, for example, GPS data (e.g., to determine the starting point of the vehicle 100), geographical map data (e.g., from an internal or external map database), traffic data (e.g., from an external traffic condition monitoring system), the target location or point (e.g., defined as x- and y-coordinates, or defined as longitude and latitude coordinates), as well as any user-defined preferences (e.g., preference to avoid toll roads).

The planned path output (e.g., path data 228) from mission planner 310 defines the route to reach the target location from the starting point. The planned path output from the mission planner 310 may include a set of intermediate target locations (or waypoints) along the route. The intermediate target locations may be defined at road intersections to indicate which road to take at each intersection, for example. The intermediate target locations may be used for planning at the behavior level (e.g., decision-making to decide the appropriate vehicle behavior).

The behavior planner 320 receives the planned path output from the mission planner 310, including a set of intermediate target positions (if any). The behavior planner 320 generates a behavior decision in order to control the behavior of the vehicle 100 on a more localized and short-term basis than the mission planner 310. In example embodiments, behavior planner 320 is responsive to channel data generated by channel generator 340. The behavior planner 320 also generates an output representing the behavior decision that may serve as a target for the motion planner 330. The behavior planner 320 may generate a behavior decision that is in accordance with certain rules or guidance. For example, the behavior planner 320 may ensure that the vehicle 100 follows certain behavior rules (e.g., left turns should be made from the left-most lane, vehicle speed should be within a speed limit, vehicle should stop at a stop sign, etc.). Such behavior rules may be based on traffic rules, as well as based on guidance for smooth and efficient driving (e.g., the vehicle should take a faster lane if possible). The output representing the behavior decision generated by the behavior planner 320 may be in a variety of suitable formats. For example, the output representing the behavior decision generated by the behavior planner 320 may in the form of commands, signals (such as a safety signal), scalar values, and/or cost map (or cost image), among other possibilities. For example, the output representing the behavior decision generated by the behavior planner 320 may serve as constraints on motion planning.

As will be described in greater detail below, in example embodiments, channel generator 340 receives the planned path output from the mission planner 310 and receives information about static and dynamic objects that may be based on state data 226 derived from the sensor system 110. Channel generator 340 is configured to adaptively generate channel data that defines spatial constraints on the planned path.

Behavior decisions that are output by the behavior planner 320 and channel data may be in the form of commands that are provided to the motion planner 330. The motion planner 330 should be configured to determine a trajectory that satisfies the behavior decisions and channel-based spatial constraints to navigate the environment in a relatively safe, comfortable, and speedy way. The motion planner 330 should be designed to provide a safe and robust navigation in both structured and unstructured environments. A structured environment generally has well-defined drivable and non-drivable areas (e.g., a highway having clear lane markings), and which may have defined driving rules that all vehicles are expected to follow. An unstructured environment is generally an environment in which drivable and non-drivable areas are less defined (or undefined) (e.g., an open field) and which may have fewer or no driving rules for expected vehicle behavior. Regardless of whether the environment is structured or unstructured, the environment may also be highly dynamic (e.g., pedestrians and other vehicles are each moving), and each dynamic obstacle may have different and independent behaviors.

Figure 4:
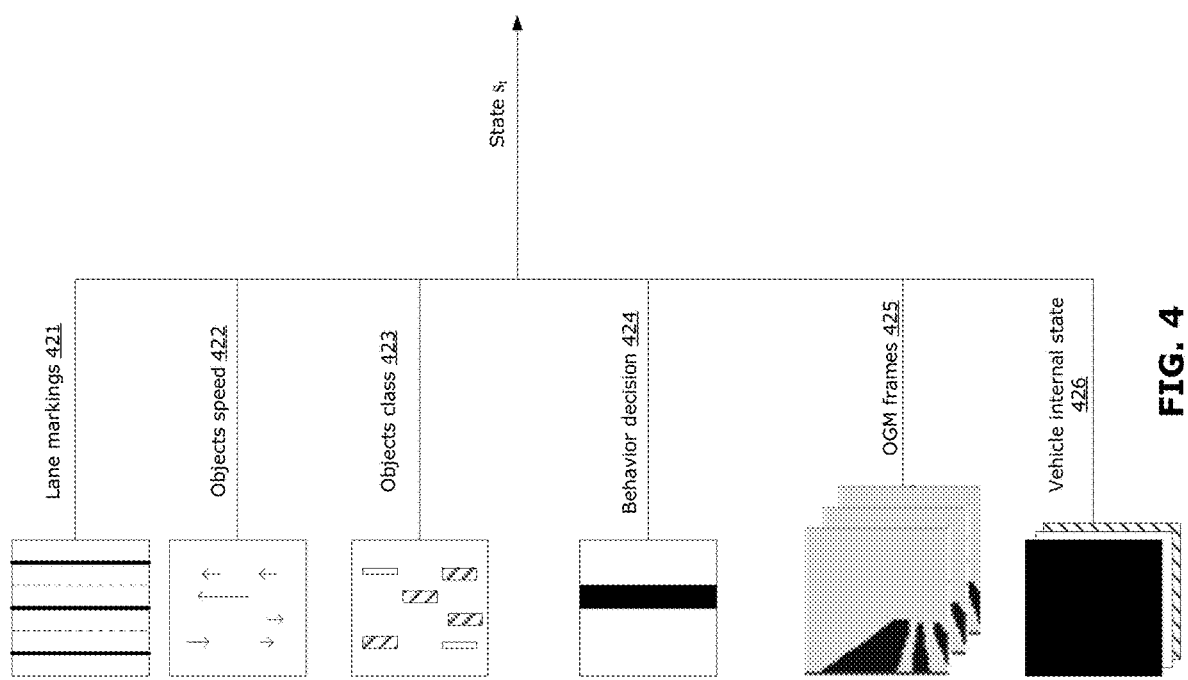
FIG. 4 illustrates examples of different state data encoded as 2D images.

FIG. 4 illustrates some examples of how state data 226 may be encoded by the state encoder 331 into a state $s_t$. In the example shown, the state data includes lane markings 421 (or other map information), which may be encoded in a single 2D image. In some embodiments, lane markings are not available. Object speeds 422 may be encoded as intensity signals in a 2D image. For example, the speed of each object can be encoded as a line proportional to the speed value and along its movement direction. Object classes 423 may be encoded using different representation for each object class of interest (e.g., car, bicycle, pedestrian, etc.). The behavior decision 424 from the behavior planner 320 may be encoded as intensity signals indicating the target behavior of the vehicle 100 (e.g., continue straight). Each OGM frame 425 may be encoded in the form of a 2D or 3D matrix. Scalar information (e.g., vehicle internal state 426 includes values that represent the internal state of the vehicle, such as speed, acceleration, etc.) can also be encoded as 2D images.

It should be noted that the behavior decision 424 may also be inputted to the trajectory generator 332 to influence the generation of trajectories. Some trajectories may be relevant for a given behavior decision, while others may not be permitted. For example, if the behavior decision is to make a right turn, curved trajectories may be relevant but straight trajectories may not be appropriate. In another example, if the behavior decision is to change to a right lane, relevant trajectories may include straight trajectories (e.g., staying in the current lane in case a lane change cannot be safely executed) and right-veering trajectories, but left-veering trajectories may not be appropriate. In another example, if the behavior decision is to stop for a stop sign, the trajectory generator may constrain the target speed in order to enforce stopping before the stop sign.

Figure 5:
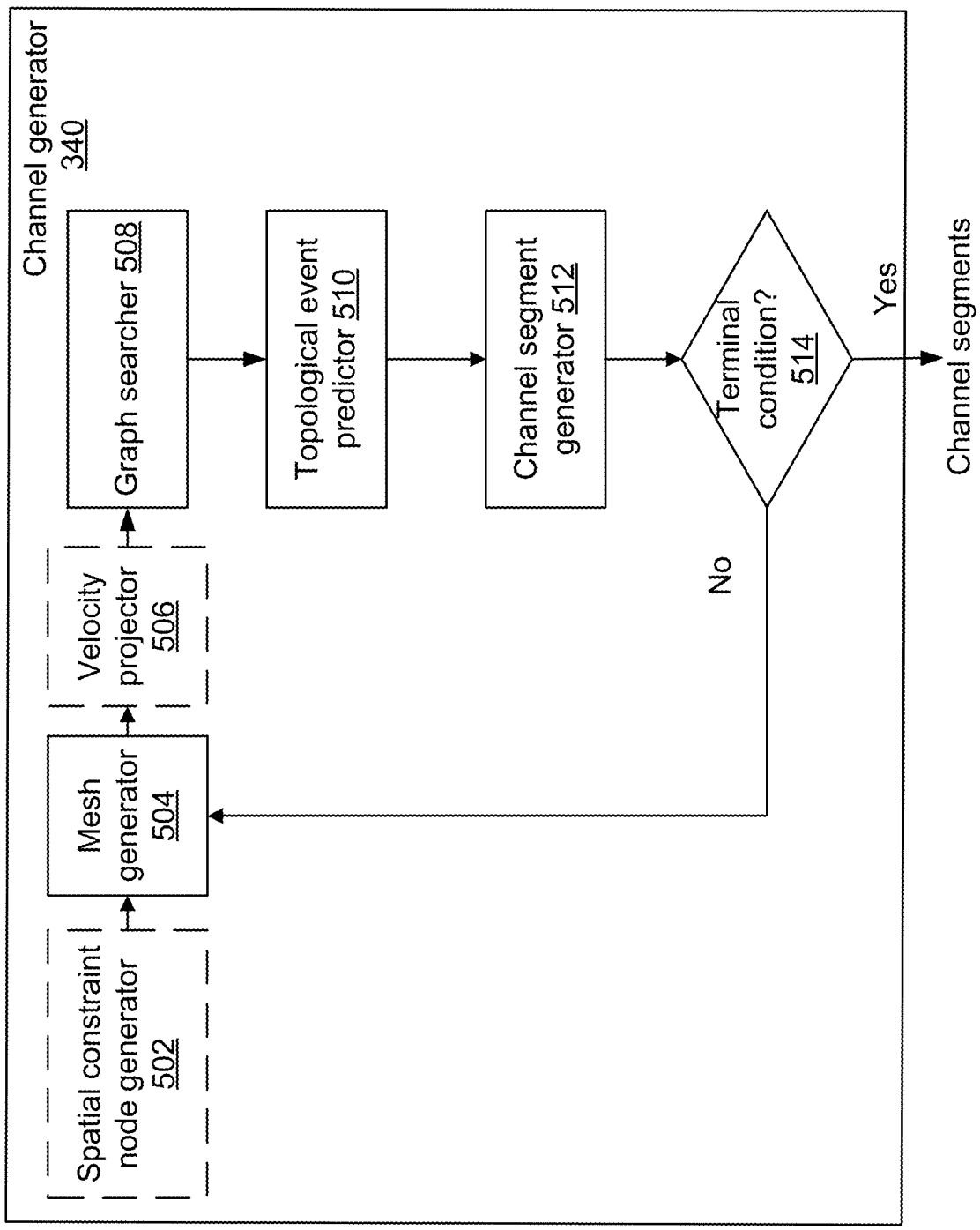
FIG. 5 is a block diagram of a channel generator module of the motion planning system in accordance with one example embodiment of the present disclosure.

FIG. 5 illustrates a simplified block diagram of the channel generator 340 of the autonomous vehicle 100 in accordance with one example embodiment of the present disclosure. In example embodiments, the channel generator 340 is configured to adaptively generate a channel for a road or area that the vehicle 100 drives on as the vehicle 100 drives from its starting location to its target location. The channel generator 340 comprises a set of modules, including a mesh generator 504, a graph searcher 508, a topological event predictor 510, a channel segment generator 512, and a decision unit 514. In example embodiments, the channel generator 340 may also include optional modules such as a spatial constraint node generator 502, and a velocity projector 506.

The channel generator 340 receives state data 226 that includes information about the current location and current motion (e.g., speed, direction, acceleration) of vehicle 100, the current location and motion of dynamic objects, and the location of static objects in the surrounding environment of the vehicle 100. Dynamic objects comprise moving objects such as pedestrians and other moving vehicles. Static objects include non-moving objects such as trees, curbs, barriers, walls, parked vehicles, and other static obstacles on the path. Dynamic and static objects are represented as dynamic nodes and static nodes, respectively, in the state data 226. Each static node represents a respective static object as a set of spatial coordinates (e.g., point representation). Similarly, each dynamic node represents a respective dynamic object as a set of spatial coordinates and motion information (e.g., direction and velocity and/or acceleration).

In example embodiments, channel generator 340 is configured to find a sequence of valid channel segments $c_i'$ across different triangulation topologies included in a channel C, i.e. $\{C:C=\cup_{i=1}^{n} c_i'\}$, where n is the number of channels such that valid channel segment $c_n'$ leads to the target location. As will be explained in greater detail below, the overall approach applied by channel generator 340 is to search through a triangulation mesh to extract a candidate channel $c_i$ from the triangulation mesh topology at time $\tau_i$, where $\tau_{i+1}$ denotes a time at which a change in the triangulation mesh topology makes part of candidate channel $c_i$ invalid. A valid portion of the candidate channel $c_i$ is identified and retained as a valid channel segment $c_i'$ for inclusion in a final channel C. The end of the valid channel segment $c_i'$ is then used as a starting point for the next candidate channel $c_{i+1}$, and the process repeated to identify and retain a valid channel segment $c_{i+1}'$ as the next channel segment in channel C, where $c_{i+1}'$ is from the expected triangulation mesh topology at $\tau_{i+1}$. The process is repeated until a final valid channel segment $c_n'$ is reached.

Figure 9:
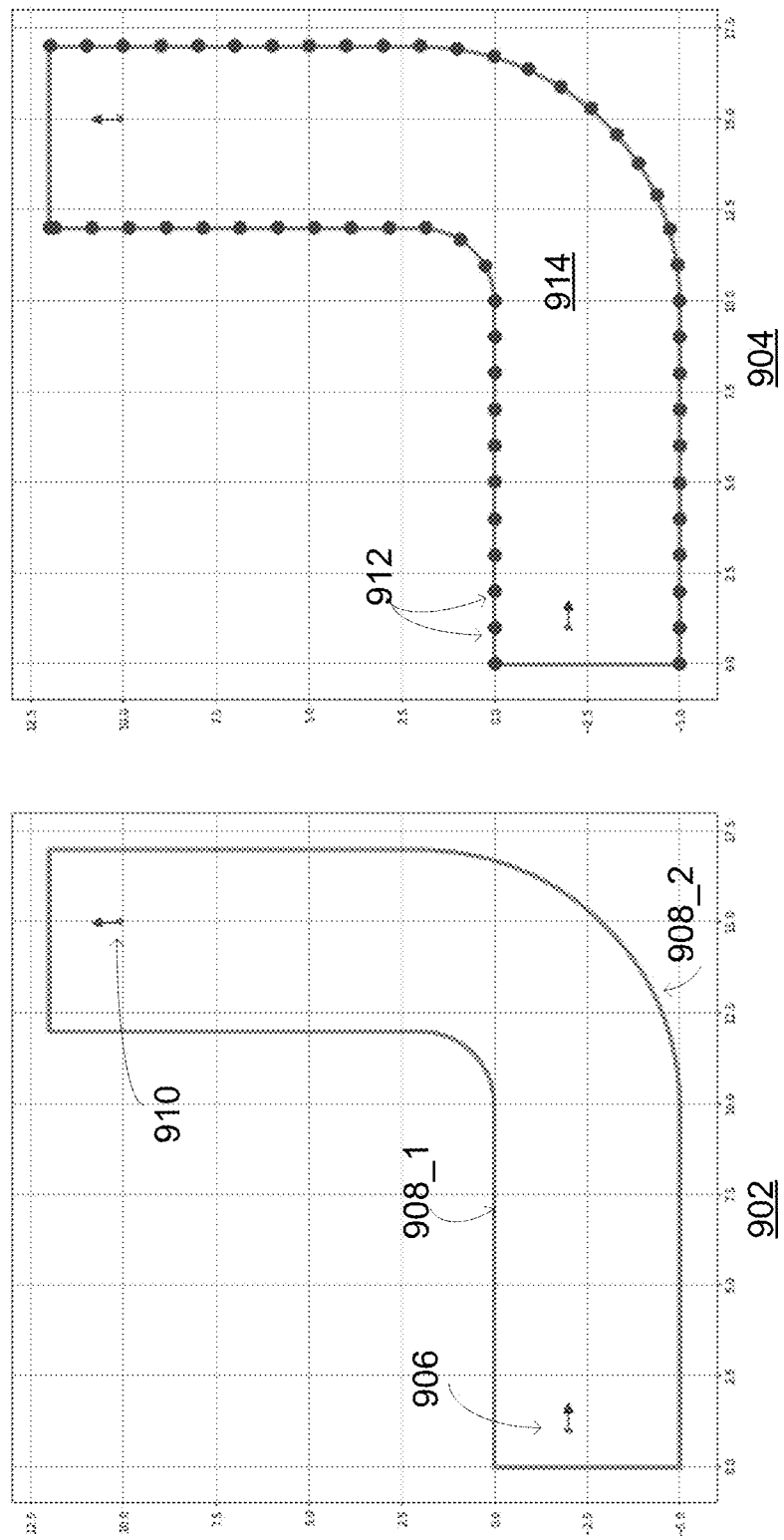
FIG. 9 shows virtual static nodes generated by a spatial constraint node generator in accordance with an example embodiment of the present disclosure.

For autonomous driving applications, it is of interest to confine the ego vehicle (also known as the autonomous vehicle) to travel within a particular region instead of allowing it to travel within the entire free space. Accordingly, in example embodiments, the channel generator 340 includes a spatial constraint node generator 502 that is configured to identify one or more boundaries for a permitted region that the vehicle will be allowed to drive in, which may, for example, be determined based on the static objects in a space surrounding the region: curbs, lane lines, barriers, walls, etc. In some examples, the boundary(ies) for a permitted region may be based on information such as lane boundaries included in a semantic map. By way of example, FIG. 9 is an example of geographical space that is intersected by the planned path indicated in path data 228 received by the channel generator 340. Subfigure 902 shows the space being open, limited by the semantic map, to generate the channel. However, subfigure 904 shows the space being limited to a region using virtual static nodes. This region is where the channel can be generated.

Boundaries 908_1, 908_2 are determined for the permitted region based on known static objects and/or information from a semantic map. The planned path through the region extends within boundaries 908_1 and 908_2 from a starting location 906 (e.g., location of the vehicle at time $\tau_i$) and ends at a target location 910 (which may be a final or intermediate target location).

Spatial constraint node generator 502 converts each boundary 908_1, 908_2 into a series of evenly spaced virtual static nodes 912, with the spacing of the static nodes 912 in each series being narrow enough such that the vehicle cannot cross between the virtual static nodes 912.

Accordingly, in embodiments that include a spatial constraint node generator 502, the spatial constraint node generator 502 receives the path data 228, boundary information (e.g. locations of static objects that can be extrapolated to define boundaries, or semantic map information indicating lane boundaries) and generates a plurality of virtual static nodes 912 that identify a confined permitted region 914 through which the vehicle can travel. The coordinates of the virtual static nodes can be stored as part of state data 226 in the data module 145 and as a subset of the static nodes determined in respect of physical objects.

The mesh generator 504 is configured to generate a triangulation mesh representation of the vehicle environment. Different triangulation mesh methodologies can be applied in various examples, including methodologies based on Delaunay triangulation, constrained Delaunay triangulation, dynamic Delaunay triangulation, Ruppert's algorithm, or other triangulation mesh algorithms. In some examples, a dual graph representation based on Delaunay triangulation may be applied in which a triangulation mesh topography is defined by a set of adjacent triangles having vertices corresponding to static nodes and dynamic nodes. Further, a dual graph is generated that overlies the triangulation mesh and includes one dual graph node for each triangle of the triangulation mesh and one dual graph edge for each triangle edge in the triangulation mesh that separates a pair of triangles. In the example where a dual graph triangulation mesh topography is applied, the Target Attraction Principle proposed in the document: H. Yan, H. Wang, Y. Chen, and G. Dai, "Path planning based on constrained Delaunay triangulation," in 2008 7th World Congress on Intelligent Control and Automation. IEEE, 2008, pp. 5168-5173 may be applied to position the dual graph nodes since the cost of reaching a triangle is computed based on the position of the dual graph node within that triangle.

FIG. 10A is an illustrative example of a triangulation mesh generated using Delaunay triangulation in respect to a set of dynamic nodes 1006 and static nodes 912 included in a vehicle environment. Block 1002 indicates the point representations of the dynamic nodes 1006 and static nodes 912 that are used to generate a first graph of triangulation mesh 1008, shown in Block 1004. Reference 1001 indicates a dynamic node that corresponds to a starting location 906 (e.g., location of the vehicle at time $\tau_i$). The vehicle dynamic node 1001 is not included in the triangulation mesh. Dynamic nodes 1006 could, for example, represent a cyclist and a pedestrian approaching the permitted region 914. FIG. 10A does not show any dual graph nodes. In example embodiments, a respective dual graph node is positioned within each of the respective triangles included in the permitted region 914.

In an embodiment where the spatial constraint node generator 592 does not exist, the mesh generator 504 will not have access to virtual static nodes and uses only the dynamic nodes and previously known static nodes (e.g., static nodes available from sensed data or semantic map data) to generate the triangulation mesh.

Figure 10B:
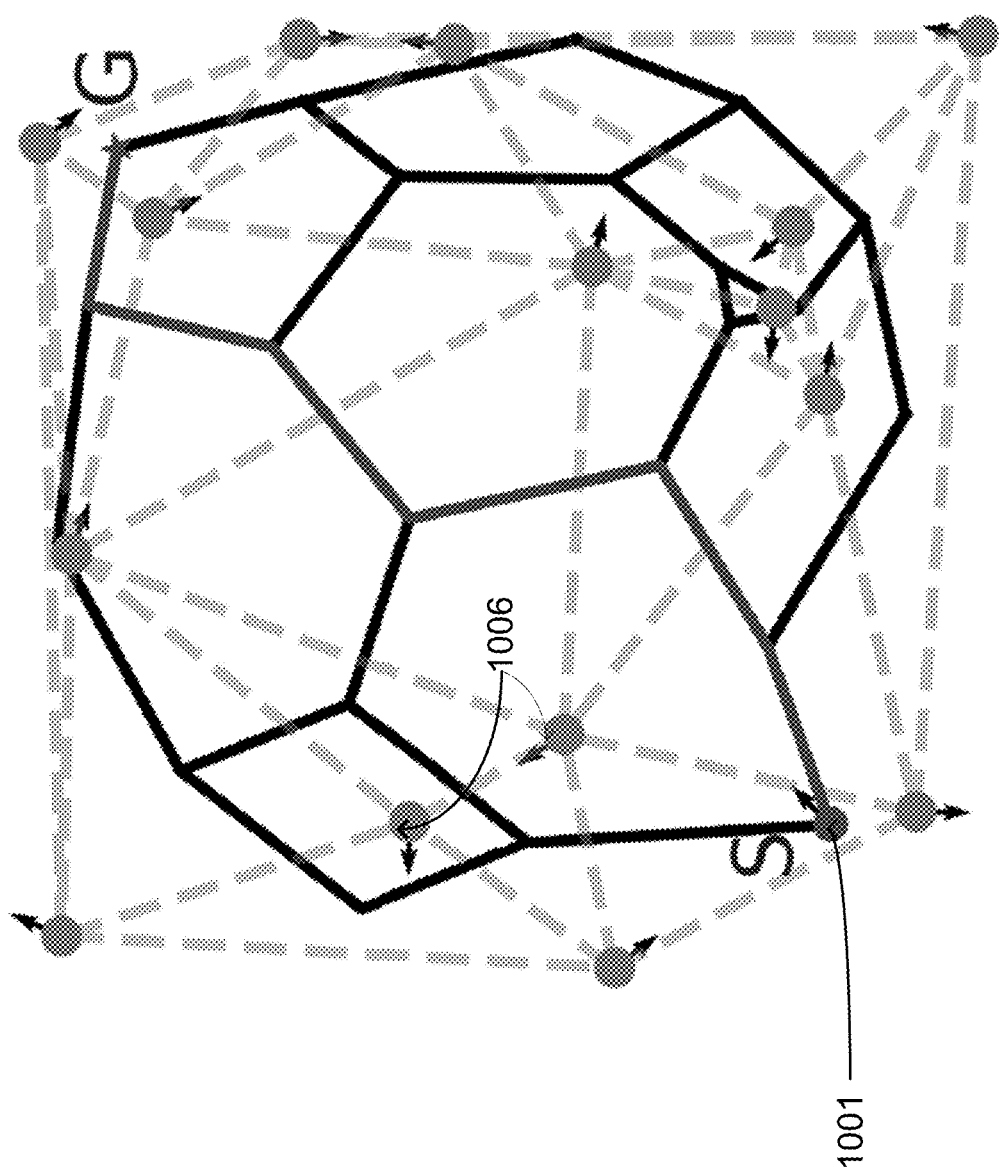
FIG. 10B shows an example of triangulation mesh generation with a dual graph overlay by a mesh generator in accordance with one example embodiment of the present disclosure.

For illustrative purposes, FIG. 10B is an illustrative example showing a triangulation mesh generated using Delaunay triangulation in the absence of a spatial constraint node generator 502. The triangulation mesh of FIG. 10B includes a plurality of dynamic node 1006 vertices, connected by edges (dashed lines), forming a set of adjacent triangles. A dual graph topology, shown as solid lines that forms polygonal cells, overlays the triangulation mesh topology. The dual graph nodes are each located within a respective one of the triangulation mesh triangles.

The locations of the dynamic nodes can be estimated using at least one of mathematical models including linear or non-linear models; statistical models including Kalman filters, particle filters, or regression; or machine learning-based models including support vector machine for regression, decision trees, distributional learning, variational inference, and a neural network.

Referring again to FIG. 5, as noted above, in example embodiments, the channel generator includes a velocity projector 506. Every dynamic node has a velocity and direction. Also, as discussed above, all dynamic nodes and static nodes are connected in a mesh structure; therefore, each dynamic and static node may have multiple edges that connect it to other nodes. As will be explained below, downstream modules perform computations on the interaction of adjacent nodes in the triangulation mesh. Velocity projector 506 is configured to transmit motion information of the dynamic nodes within the triangulation mesh to distant nodes (i.e., not just adjacent nodes). This transmission enables the topological event predictor 510 to focus on interactions between adjacent nodes while still receiving motion information about distant dynamic nodes.

In this regard, velocity projector 506 is used to project each dynamic node's velocity along its edges (e.g., the edges that connect the dynamic node to other static nodes or dynamic nodes). The velocity projector 506 also calculates penalties that are added to the dynamic node's velocity to emphasize or de-emphasize the impact of the dynamic node's velocity magnitude for topological event detection. In example embodiments, the velocity of each source node (also referred to as dynamic node) is projected onto receiving nodes (also referred to as adjacent nodes) by a vector multiplication between the velocity vector of the dynamic node and the position vector from the dynamic node to each receiving node as shown in equation (1).

$$v'_{new} = \max\left(v'_{old}, \left(\frac{\alpha}{\|p\|+\alpha}\right)\left(1-2\frac{\theta}{\pi}\right)^\beta v_{src}\right), \quad (1)$$

Where $v'_{new}$ is the computed velocity vector node; $v'_{old}$ is the pre-existing velocity information at the receiving node (which is 0 for static nodes); $v_{src}$ is the velocity vector of the source node, p is the positional vector from the source node to the receiving node, and θ is the angle between source node velocity vector $v_{src}$ and the positional vector p. The term $$\left(\frac{\alpha}{\|p\|+\alpha}\right),$$

is controlled by distance penalty parameter α, which decreases the velocity magnitude as the distance increases between the source node and the receiving node. The term $$\left(1-2\frac{\theta}{\pi}\right)^\beta$$

is controlled by an angle penalty parameter, which decreases the velocity magnitude as the angle increases between vectors $v_{src}$ and p.

For illustrative purposes, FIG. 12 shows example graphs of distance and angular penalties used by velocity projector 506 in accordance with one example embodiment of the present disclosure. The parameters a and 8 control the strength of the penalty. Graph 1202 demonstrates that the distance penalty is stronger as the Euclidean distance between a dynamic node i to a point of interest j increases, wherein i has coordinates $x_1$ and $y_1$ of a dynamic node and j has coordinates $x_2$ and $y_2$ of a point of interest. The Euclidean distance d(i,j) is calculated as $d(i,j)=\|i-j\|=\sqrt{(x_1+x_2)^2+(y_1-y_2)^2}$, and the distance penalty is calculated following the equation $$\text{distance penalty} = \frac{\alpha}{\|i-j\|+\alpha},$$

wherein α is a distance penalty factor. Graph 1202 shows the impact of a on the penalty.

Similarly, the angular penalty can be calculated as $$\text{angular penalty} = \left(1-\frac{\theta}{\pi}\right)^\beta$$

(note that this penalty term differs from the penalty term included in equation 1 above where the angle is multiplied by a factor 2), wherein θ is the angle between the positional vector p corresponding to an edge of a dynamic node and the direction of the dynamic node ($v_{src}$) and β is an angular penalty factor. The angular penalty is stronger as the angle θ between the dynamic node's edge and the direction of the dynamic node increases. The graph in 1204 demonstrates the penalty with different factor values β.

Figure 11:
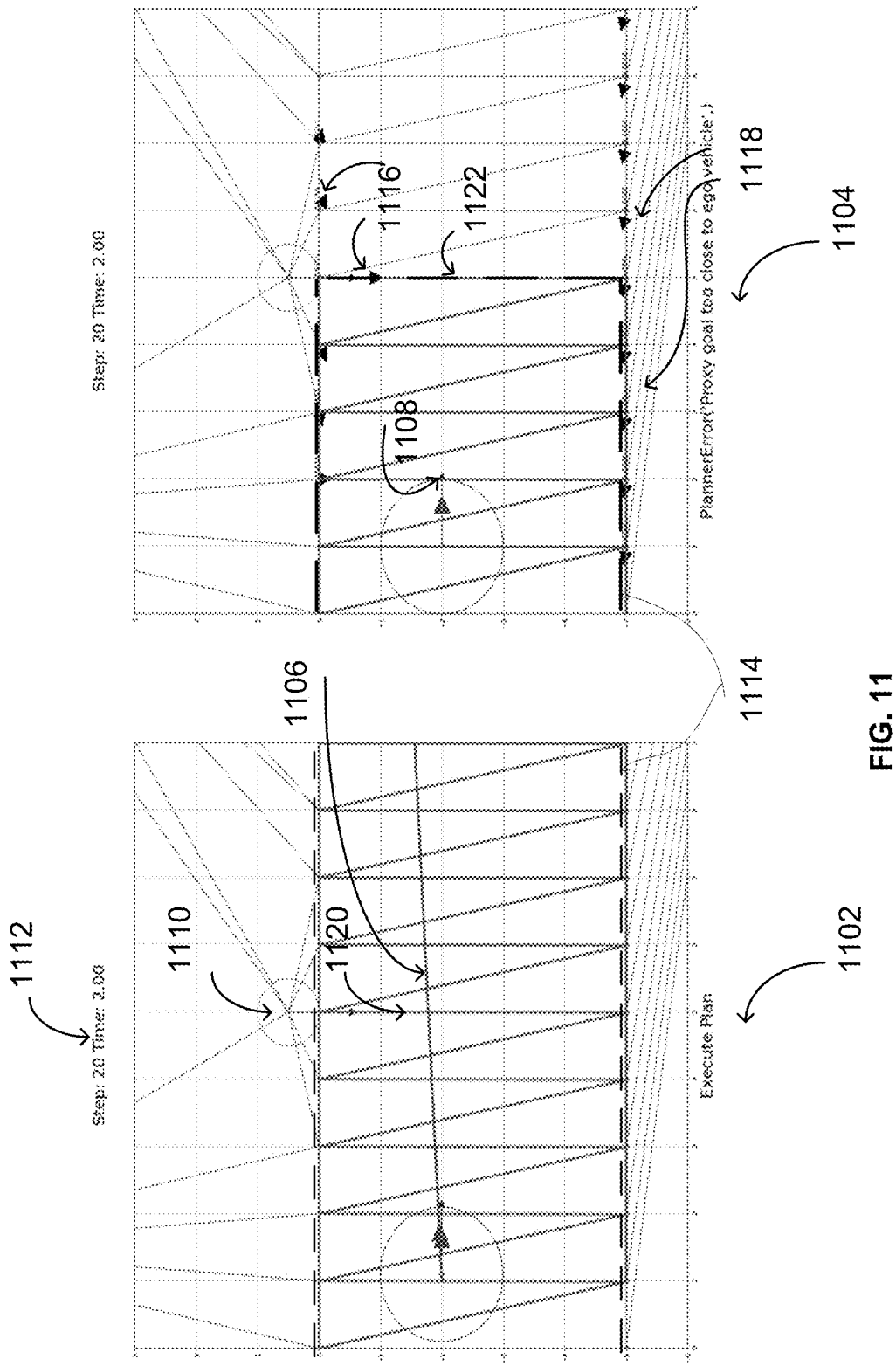
FIG. 11 shows velocity projection of a dynamic object on a triangulation mesh of a channel in accordance with an example embodiment of the present disclosure.

FIG. 11 shows a dynamic nodes' projected velocity in accordance with one example embodiment of the present disclosure. Subfigure 1102 demonstrates a dynamic node 1110 without projecting its velocity. In 1102, the edge at 1120 is mistakenly identified as crossable, but this is not the case in 1104 where the node's velocity is projected. In 1104, the edge 1122 is correctly identified as non-crossable. The dashed lines 1114 demonstrate the crossable mesh. When the velocity was not projected in 1102, the candidate channel is dashed, which means it is a crossable area. However, when velocity was projected on the dynamic node's edges, a candidate channel's dashed lines are terminated, as shown at 1122, which means this is non-crossable. Accordingly, without projecting the velocity of the dynamic node 1110, the vehicle's path 1106 is not affected by the dynamic node, whereas the path was truncated in 1104 as shown at 1108. Both subfigures 1102 and 1104 are snapshots for the vehicle after 2 time units 1112. Both subfigures are simulations of a vehicle after 2 seconds. The velocity projection is projected along the edges of its dynamic node, as shown at 1116. The velocity projections at 1118 result from the projection of other dynamic nodes (not shown in the figure), dynamic nodes other than 1110.

Referring again to FIG. 5, the next module in channel generator 340 is the graph searcher 508. Graph searcher 508 receives the triangulation mesh and searches for a candidate channel $c_i$ corresponding to a sequence of triangles in the triangulation mesh. In an example embodiment, graph searcher 508 searches for a candidate channel $c_i$ within triangulation mesh topology at time $\tau_i$ by searching through the dual graph of the triangulation mesh for a channel that leads from the starting location (e.g., current vehicle position a time $\tau_i$) to a target location (e.g., planned path target destination or an intermediate target destination along the panned path). In an example embodiment, the Timed A* graph search methodology is used to identify candidate channel $c_i$. The Timed A* graph search methodology is discussed in Cao, Chao, Peter Trautman, and Soshi Iba. "Dynamic channel: A planning framework for crowd navigation." International Conference on Robotics and Automation (ICRA). IEEE, 2019. Timed A* accounts for the path cost change due to object dynamics by computing $f(t_{eta})=g(t_{eta})+h(t_{eta})$, where $t_{eta}$ is the estimated time of arrival of the vehicle at a subject node (a static or dynamic node). The channel generator 340 is configured to ensure that the distance between any two nodes is wide enough to allow the vehicle to cross. The channel generator 340 ensures this by checking $t_{eta}$ against the interval in which the length of the corresponding Delaunay Triangulation edge is above a threshold.

Graph searcher 508 outputs channel data that define the candidate channel $c_i$. Candidate channel $c_i$ defines a series of consecutive triangles within the triangular mesh that collectively provide a route (path) that a vehicle may be able to navigate from its current location to the target location, avoiding all static nodes and dynamic nodes.

Referring again to FIG. 5, the topological event predictor 510 is configured to predict the time and location of a future topological event that impacts the triangulation mesh that corresponds to the candidate channel $c_i$. A topological event occurs when a dynamic node in the triangulation mesh violates a predetermined triangulation mesh criteria that makes part of the candidate channel $c_i$ invalid. As noted above, time $\tau_{i+1}$ is used to denote the time at which a change in the triangulation mesh topology makes part of candidate channel $c_i$ invalid.

Figure 13A:
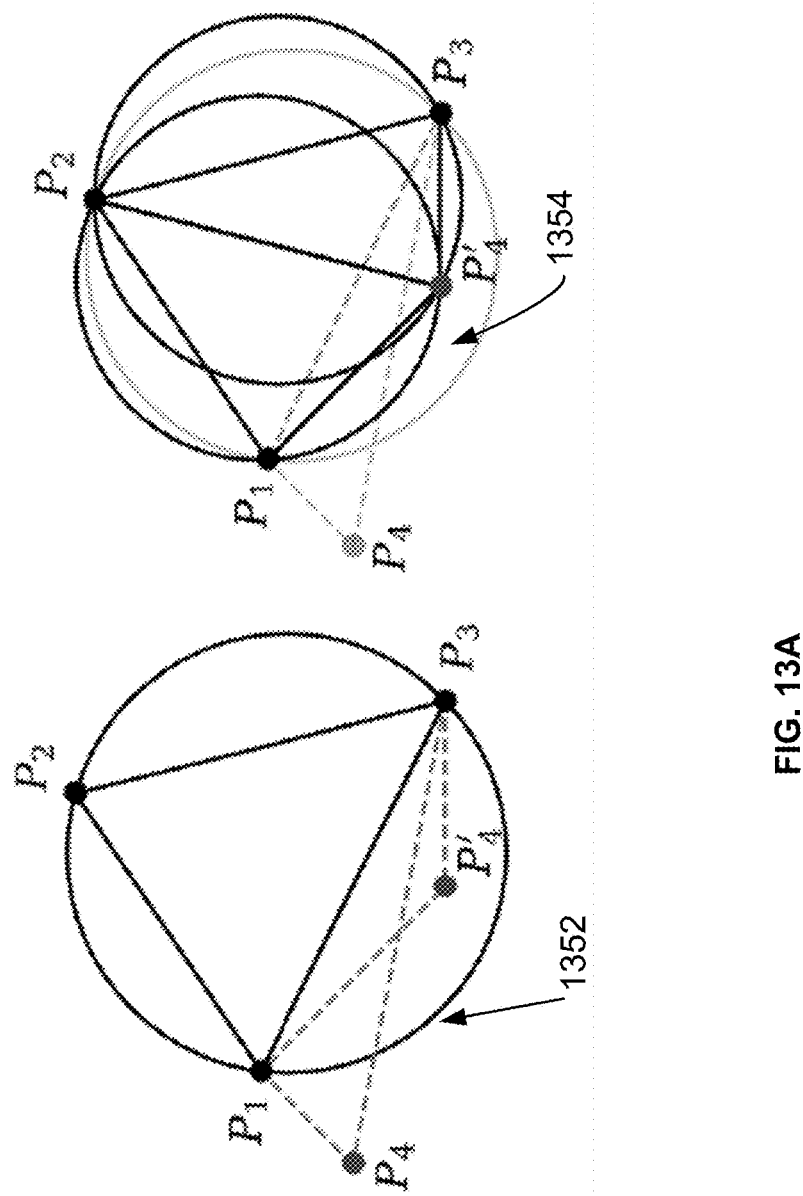
FIG. 13A shows examples of a topological event and event repair, according to example embodiments.

By way of illustration, an example of a topological event is graphically represented at 1352 of FIG. 13A, and an example of a repair of the topological event is graphically represented at 1354. A Delaunay Triangulation structure over a set of points P must satisfy the condition that no p∈P lies in the interior of the circumcircle of a triangle. The event which violates this condition is known as a topological event, an example of which is shown at 1352 (e.g., a dynamic node moves from point $P_4$ (outside the circumcircle of a triangle) to point $P'_4$ (inside the circumcircle). The time of occurrence for this event is time $\tau_{i+1}$. This violation can be locally repaired by flipping an edge as shown in 1354. Repairing the Delaunay Triangulation structure via edge flipping replaces the two triangles that cause the violation. Doing so introduces new node adjacency, dual graph nodes, and dual graph edges that were not known to the upstream modules of the channel generator 340. Accordingly, the triangles of candidate channel $c_i$ that will not yet be reached by the vehicle at the topological event time $\tau_{i+1}$ are considered to be invalid, and the triangles up to the triangle that the vehicle 100 is estimated to reach at the time of the topological event are considered to be valid and are selected as valid channel segment $c'_i$ that can be included in a final channel C.

Figure 6A:
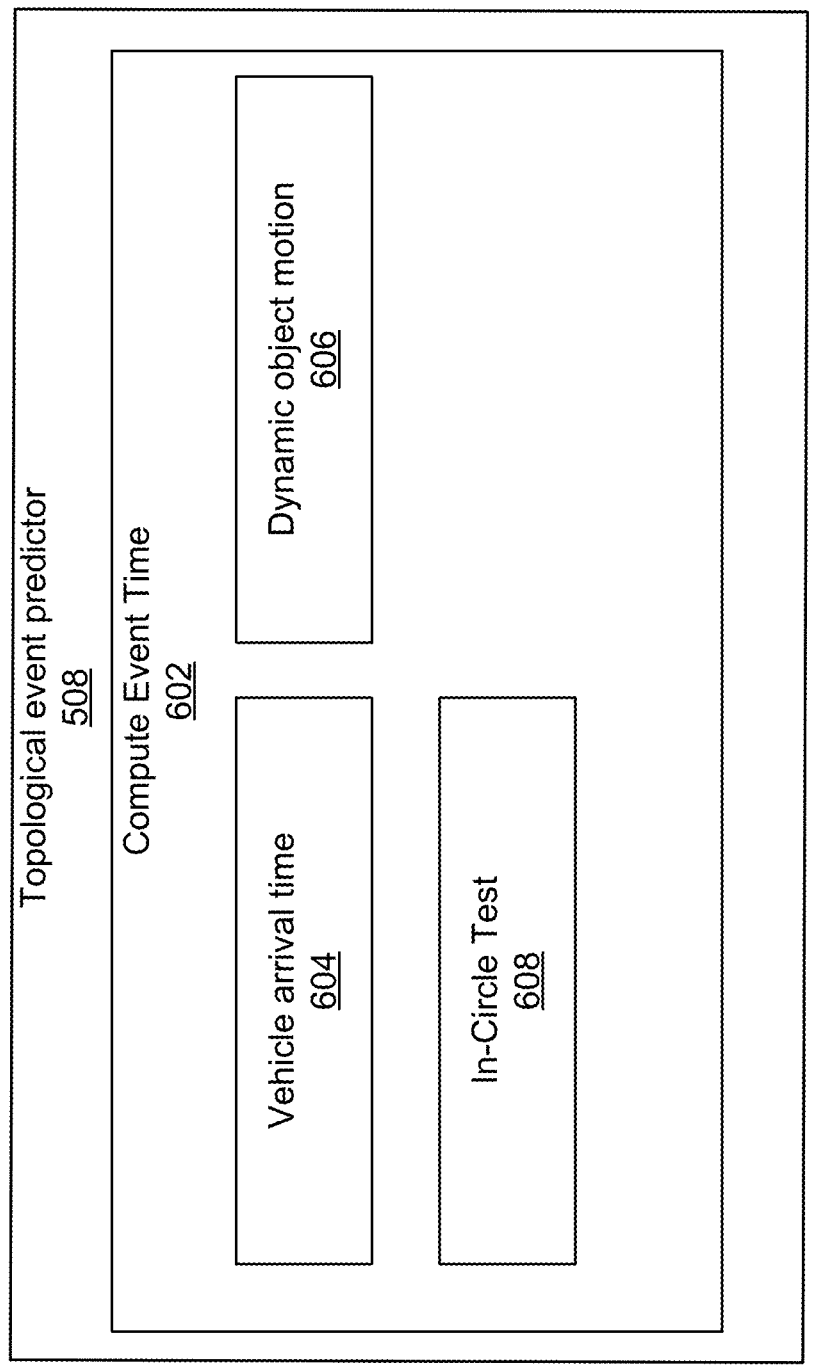
FIG. 6A is a block diagram of a topological event predictor module of a channel generator module in accordance with an example embodiment of the present disclosure.

By way of further explanation, FIG. 6A illustrates a simplified block diagram of the topological event predictor 510 of a channel generator 340 of vehicle 100 in accordance with one example embodiment of the present disclosure. The topological event predictor 510 includes a compute event time module 602 that calls on a vehicle estimated time of arrival (ETA) function 604, a dynamic object motion function 606, and an in-circle test function 608. FIG. 6B shows a pseudocode representation of a compute topological event time algorithm 602A that is performed by compute event time module 602. Reference numbers are included in FIG. 6B to indicate where in the compute topological event time algorithm 602A the respective functions 604, 606 and 608 are defined and called.

In example embodiments, the in-circle test function 608 is configured to determine, for a subject triangle, if a $4^{th}$ point (e.g., $P'_4$ in FIG. 13A) falls within the circumcircle of the subject triangle that is defined by three other points. Example embodiments of different possible in-circle test methodologies will now be described, wherein $(x_i, y_i)$, $i \in (1, 2, 3)$ are coordinates for the vertice nodes of a subject triangle, and $(x_4, y_4)$ are the coordinates of a dynamic node adjacent that is adjacent to the subject triangle.

In one example embodiment, a determinant det(I) is solved at evenly spaced time points, namely det(I) is solved for all $(x_i, y_i)$, at a time t, $t=t_{eta}$. The following 4×4 matrix for each triangle and dynamic node at evenly spaced time samples:

$$I = \begin{bmatrix} x_1 & y_1 & x_1^2 + y_1^2 & 1 \\ x_2 & y_2 & x_2^2 + y_2^2 & 1 \\ x_3 & y_3 & x_3^2 + y_3^2 & 1 \\ x_4 & y_4 & x_4^2 + y_4^2 & 1 \end{bmatrix}$$

wherein $(x_1, y_1)$, $(x_2, y_2)$, $(x_3, y_3)$ are spatial coordinates of a triangle of the triangulation mesh of the candidate channel, and $(x_4, y_4)$ is spatial coordinates of a dynamic node at a point in time.

The sampling interval is for a period from a present time up to a time when the vehicle is estimated to be at the triangle where the in-circle test is calculated for.

In a further example embodiment, in-circle test function 608 solves the following determinant of time parameterized motion model equations:

$$\det I(t) = \det \begin{bmatrix} x_1(t) & y_1(t) & x_1^2(t) + y_1^2(t) & 1 \\ x_2(t) & y_2(t) & x_2^2(t) + y_2^2(t) & 1 \\ x_3(t) & y_3(t) & x_3^2(t) + y_3^2(t) & 1 \\ x_4(t) & y_4(t) & x_4^2(t) + y_4^2(t) & 1 \end{bmatrix} = 0$$

wherein $(x_1(t), y_1(t))$, $(x_2(t), y_2(t))$, $(x_3(t), y_3(t))$ are time parameterized motion model coordinates of a triangle of the triangulation mesh, and $(x_4(t), y_4(t))$ is time parametrized motion model coordinates of a dynamic node of the dynamic nodes. This method may not require repeating at specific time samples. This equation is discussed in Vomácka, Tomás and I. Kolingerová. "Computation of Topologic Events in Kinetic Delaunay Triangulation using Sturm Sequences of Polynomials." (2008).

In a third example embodiment, in-circle test function 608 determines the product of the determinants of two matrices as follows:

$$\gamma = \det \begin{bmatrix} 1 & x_1 & y_1 & x_1^2 + y_1^2 \\ 1 & x_2 & y_2 & x_2^2 + y_2^2 \\ 1 & x_3 & y_3 & x_3^2 + y_3^2 \\ 1 & x_4 & y_4 & x_4^2 + y_4^2 \end{bmatrix} \times \det \begin{bmatrix} 1 & x_1 & y_1 \\ 1 & x_2 & y_2 \\ 1 & x_3 & y_3 \end{bmatrix}$$

In this third example, the determinant of the $1^{st}$ matrix is the in-circle test. The determinant of the $2^{nd}$ matrix indicates the orientation of the three vertices of the subject triangle. This third example method corrects the signs of the in-circle test such that it is insensitive to the ordering of the first three points. The computed value of the determinant multiplication could be γ<0, which means the 4th point (e.g., a dynamic node) is inside the circumcircle; γ=0, which means the 4th point is co-circular with the circumcircle; and γ>0, which means the 4th point is outside the circumcircle.

Referring again to FIG. 6B, compute topological event time algorithm 602A the time $\tau_{i+1}$, the first occurrence of a topological event in candidate channel $c_i$. This is achieved by performing the in-circle test using $((x_i(t_j), y_i(t_j))\forall i \in \{1, \ldots, 4\})$ where $t_j \in [t_0, t_k]$. $(x_i(t_j), y_i(t_j))$ is the expected position of an $i^{th}$ point at time $t_j$, and $t_1$ is a time point taken at even intervals from $[t_0, t_k]$, $t_0$ is the time at which the vehicle is at its starting location, and $t_k$ is the vehicle's estimated time of arrival to the $k^{th}$ triangle within candidate channel $c_i$.

Algorithm 602A will terminate before reaching the final triangle of the candidate channel $c_i$ if the in-circle test finds a topological event within a sampled time point that corresponds to candidate channel $c_i$. In such a case, a time is returned that corresponds to topological event time $\tau_{i+1}$. Suppose no topological event is found for any triangle within the candidate channel $c_i$. In that case, the algorithm 602A terminates and returns "None", meaning that candidate channel $c_i$ is the final segment of channel C, which is the final channel.

The dynamic object motion function 606 corresponds to dynamicModel( ) in Algorithm 602A and is configured to return an expected position $(x_i(t_j), y_i(t_j))$ of an $i^{th}$ point (e.g., a dynamic node) at time $t_j$, as per equation 2:

$$p^i(t) = p_0^i + f(v,t) \qquad (2)$$

Where, $p^i(t)$ is the position at time $t_j$ and $p_0$ is the starting position of the vehicle. In example embodiments, the speed of the dynamic node is assumed to be constant, and a linear model $f(v,t)=v^i t$ is used.

The vehicle ETA function 604 corresponds to getETA( ) in Algorithm 602A and is configured to estimate the time of arrival ($t_{eta}$) of the vehicle to a subject triangle. In example embodiments, a linear motion model is applied, and a vehicle path is determined based on the graph edges that connect the graph nodes that are located within respective triangles of the candidate channel $c_i$. As noted above, mesh generator 504 applies a target attraction principle to position the graph node that represents each triangle. The arrival time $t_{eta}$ is then estimated by dividing the vehicle's speed over the travel distance from the starting position to the graph node corresponding to the subject triangle.

Accordingly, topological event predictor 510 determines if a topological event will occur in a candidate channel $c_i$ before the vehicle reaches a target location, and if a topological event is predicted, the topological event predictor 510 will provide: (1) a predicted topological event time $\tau_{i+1}$; and (2) an identity of the triangle that failed the in-circle test; and (3) an expected vehicle location at topological event time $\tau_{i+1}$.

Figure 7:
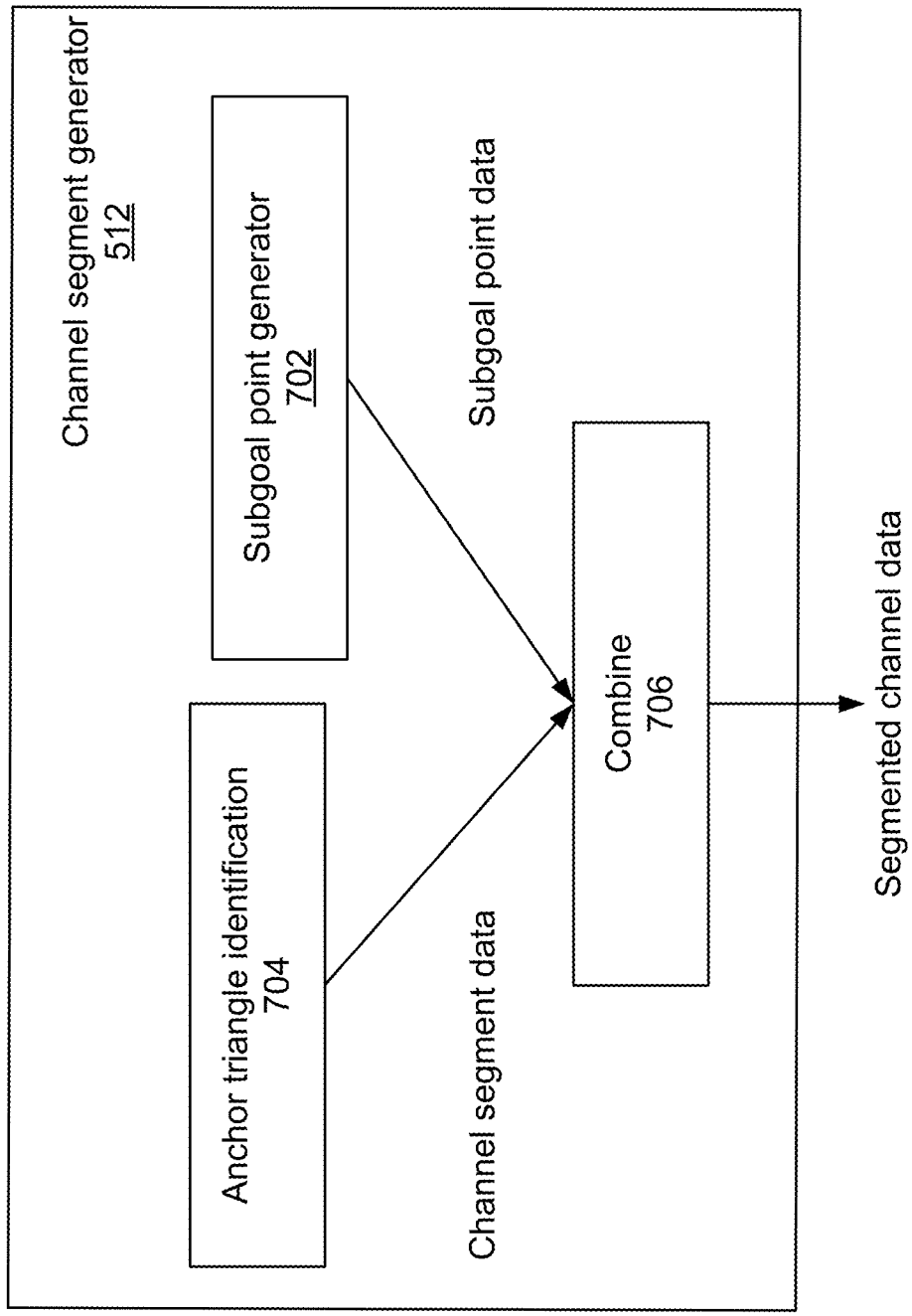
FIG. 7 is a block diagram of a channel segment generator module of a channel generator module in accordance with an example embodiment of the present disclosure.

The channel segment generator 512 is configured to select the portion of a candidate channel $c_i$ that is to be truncated and the portion that is to be used as a valid channel segment $c'_i$ for inclusion in a final channel C. The channel segment generator 512 determines a valid channel segment $c'_i$ by selecting a valid channel segment end point that corresponds to a triangle located after the current vehicle position and before the next topological event. An example embodiment of this process will now be described with reference to FIG. 7 that illustrates a block diagram representation of channel segment generator 512, which includes an anchor triangle identification operation 704, subgoal point generator operation 702 and combining operation 706.

Anchor triangle identification operation is configured to identify the final triangle, $tri_{anchor}$, that will be used as the final triangle for valid channel segment $c'_i$. The final triangle, $tri_{anchor}$, will also function as the starting triangle for the next candidate channel $c_i+1$. Thus, the final triangle, $tri_{anchor}$ will overlap with the starting triangle of the next valid channel segment $c'_i+1$, thereby anchoring the end of valid channel segment $c'_i$ to the beginning of valid channel segment $c'_i+1$. Final triangle, $tri_{anchor}$ provides a transition point between the two channel segments at the instance of topological event time $\tau_{i+1}$ by being both the both the last triangle of $c'_i$ and the first triangle of $c'_i+1$.

In an example embodiment, the final triangle, $tri_{anchor}$ is selected as follows: $tri_{anchor}$ is the triangle in candidate channel $c_i$ that the vehicle is expected to be in at the time $\tau_{i+1}$ of the topological event unless that triangle corresponds to a triangle at which the topological event is expected to occur. In this case, $tri_{anchor}$ is the triangle in candidate channel $c_i$ that is immediately before the triangle that the vehicle is expected to be in at the time $\tau_{i+1}$.

In other example embodiments, the final triangle $tri_{anchor}$ may be selected at the triangle that is located between the triangle in candidate channel $c_i$ that the vehicle is expected to be in at the time $\tau_{i+1}$, and the triangle at which the topological event is expected to occur.

In example embodiments, subgoal point generator operation 702 is configured to select a collision-free point within the final anchor triangle $tri_{anchor}$ that can be provided to motion planner 330 as a point to navigate to (if required). In example embodiments, the subgoal point generator operation 702 chooses a collision-free point inside the anchor triangle $tri_{anchor}$ that corresponds to the location of the dual graph node that is located within anchor triangle $tri_{anchor}$. Hence, the collision-free point for the vehicle's subgoal position is estimated using the Target Attraction Principle.

Combining operation 706 appends the valid channel segment $c'_i$ (i.e., the portion of candidate channel $c_i$ that extends from its first triangle up to and including the anchor triangle $tri_{anchor}$) to the end of the final channel C.

As noted above, Algorithm 602A will return "None" in the case where a topological event is not detected in a candidate channel $c_i$ prior to the expected time of arrival at the target destination location, indicating a terminal condition to decision unit 514. In such case, the candidate channel $c_i$ in its entirety is a final valid channel segment $c_n$ and will from the final segment of final channel C. Thus, in example embodiments, when Algorithm 602A returns "None" in respect of a topological event time, then the candidate channel $c_i$ leads to a target point without any of the triangles in that candidate channel $c_i$ seeing a topological event. This means that i=n and final channel $C=\{c'_1, \ldots, c'_n\}$ and each final channel be used to plan a path (or path segment).

The channel generator 340 will repeat the process of identifying and adding channel segments to generate channel C until a terminal condition is reached. In some examples, termination conditions may also include the identification of a threshold number of channel segments and/or when the time of a next predicted triangulation mesh event exceeds a threshold time.

In example embodiments, the output of channel generator 340 is a result from the overall system is a sequence of channel segments $c'_i$, $\{C:C=\{c_1', \ldots, c_i', \ldots, c_n'\}\}$, where each channel segment $c'_i$ is from a different triangulation topology.

Figure 8:
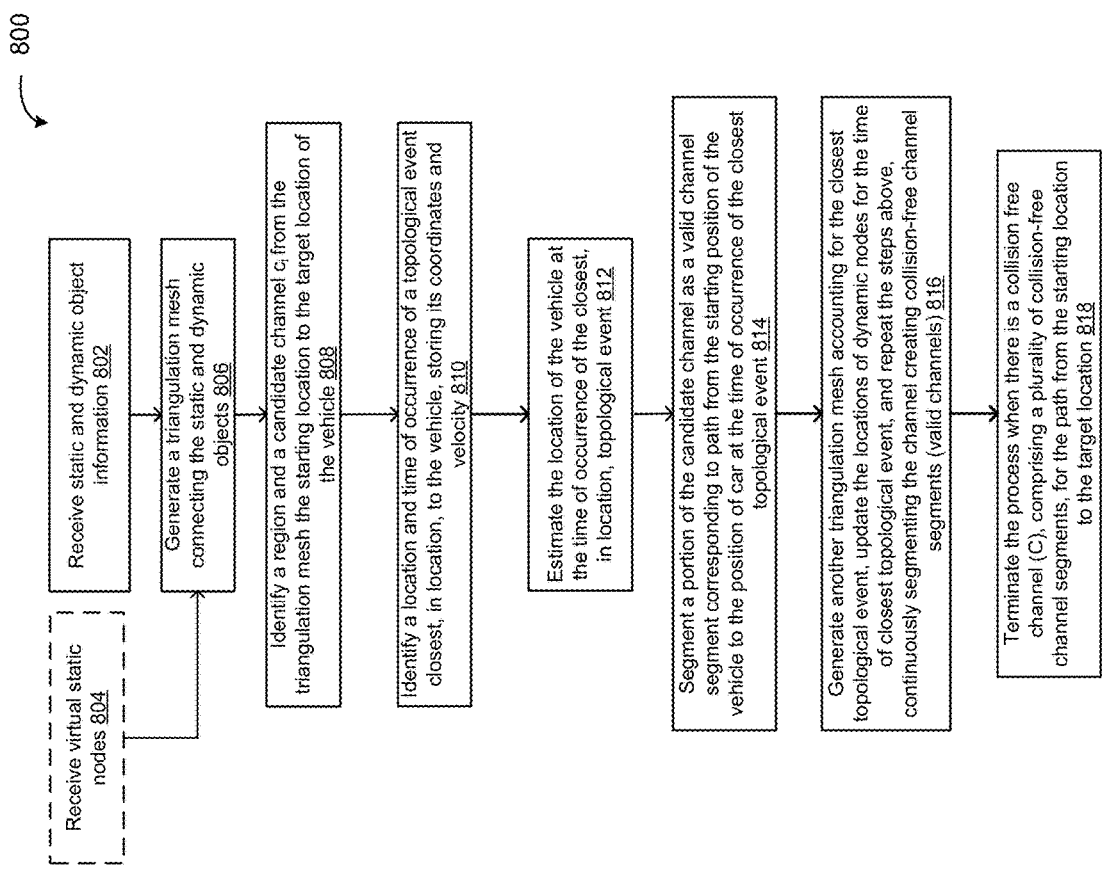
FIG. 8 is a flowchart of a method for determining valid channel segments of an autonomous vehicle in accordance with an example embodiment of the present disclosure.

FIG. 8 is a flowchart of a method 800 generating a channel C in accordance with one example of the present disclosure. The method 800 may be carried out by software executed, for example, by the processor 210. Coding of software for carrying out such a method 800 is within the scope of a person of ordinary skill in the art provided the present disclosure. The method 800 may contain additional or fewer steps than shown and/or described and may be performed in a different order. Machine-readable code executable by the processor 210 to perform the method 800 may be stored in a non-transitory machine-readable medium, such as the electronic storage 220 of the vehicle.

The method 800 begins at step 802. At step 802, a vehicle's starting location is received from a GPS unit; the starting location may be represented by its coordinates. The method 800 also uses the locations of a plurality of static objects; and the locations, directions, and velocities of a plurality of dynamic objects. The static objects comprise trees, curbs, etc. Dynamic objects comprise pedestrians, other vehicles, etc. The dynamic and static objects are represented as nodes stored in the vehicle's memory. In an embodiment, the processor 210 performing the method 800 may optionally receive virtual static nodes 804 created by a spatial constraint node generator 502 (FIG. 5) as a boundary to constrain planning. At step 806, the processor 210 performing the method 800 generates a triangulation mesh based on a mesh's specific criteria connecting all nodes: dynamic, static, and virtual static nodes. At step 808, from the triangulation mesh, the processor 210 performing the method 800 identifies a region from the starting location to the target location of the vehicle, storing the region in the memory. The candidate channel $c_i$ is identified using one or more graph searcher algorithms, including Anytime A*, D* lite, Time A*, or other algorithms. The candidate channel information is stored in the memory. The method 800 proceeds to step 810.

The candidate channel $c_i$ may have parts of invalid of invalid channel. At step 810, the processor 210 performing the method 800 identifies the times and locations of topological events of a plurality of dynamic nodes, excluding the vehicle's dynamic node. In particular, it identifies a topological event of a closest distance to the vehicle's location in the candidate channel, i.e. a first candidate channel $c_i$. At step 812, the processor 210 performing the method estimates the vehicle's location at the time of occurrence of the closest topological event. The triangle where the vehicle is estimated to reach at the time of the closest topological event is an anchor triangle. At step 814, the processor 210 performing the method uses the anchor triangle information to find a valid channel segment, which is a valid candidate channel $c'_i$. Therefore the channel, at this stage, is segmented into a valid portion, which corresponds to valid channels ($c'_i$) and an invalid portion. The method accordingly stores the valid channel segment's coordinates (valid channels $c'_i$), the time the channel is valid for, starting location, and target location. At step 816, the processor 210 performing the method invokes the mesh generator 504 to generate another triangulation mesh accounting for the closest occurring topological event and resolving any violations in the triangulation mesh. Further, the processor 210 performing the method updates the locations of dynamic nodes for the time of closest topological event. The processor 210 performing the method then repeats the aforementioned steps until valid channel segments ($c_1'$, ..., $c_i'$, ..., $c_n'$) reaches the target location, at which the processor 210 performing the method 800 terminates. At step 818, the method is completed and a valid channel C comprises a plurality of valid channel segments (valid channels $c_1'$, ..., $c_i'$, ..., $c_n'$) for the path from the starting location to the destination location is determined.

Figure 13B:
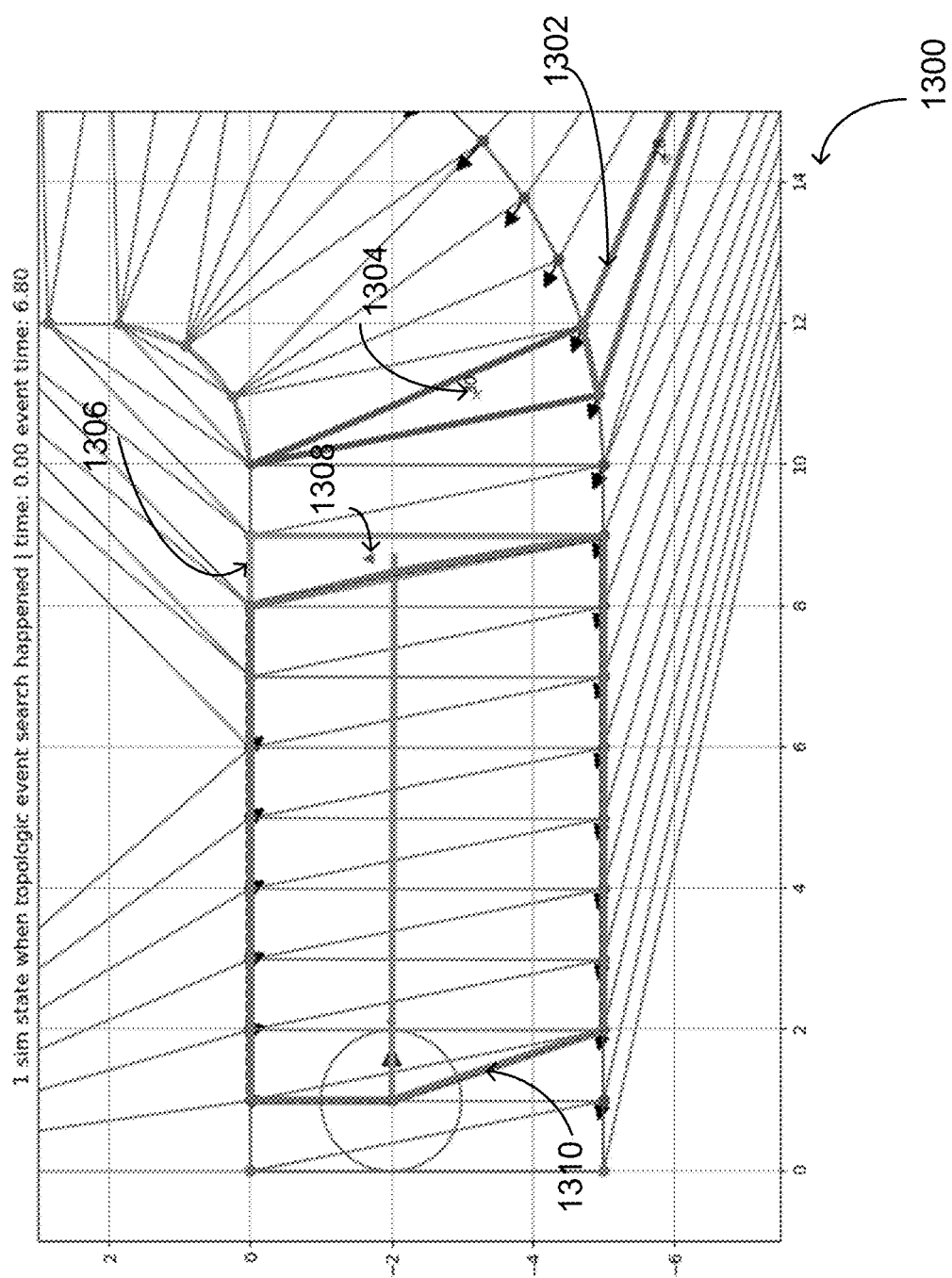
FIG. 13B shows the channel generator determining a valid channel segment in accordance with one example embodiment of the present disclosure.

FIG. 13B is an example of a channel C 1300 according to an embodiment. The edges of a triangulation mesh 1302 of a dynamic node (not shown) caused a topological event on triangle 1304. When the topological event occurred, a channel segment generator 512 estimated the vehicle's position to be at triangle 1306. This triangle is the anchor triangle. The candidate channel's portion from the starting location of the vehicle to the anchor triangle is a valid channel segment ($c'_i$). A vehicle requires a starting location and a target location for a channel to be generated. Therefore, a sub-target location is considered, as shown at 1308. A valid channel is marked with a dashed line at 1310.

Figure 14:
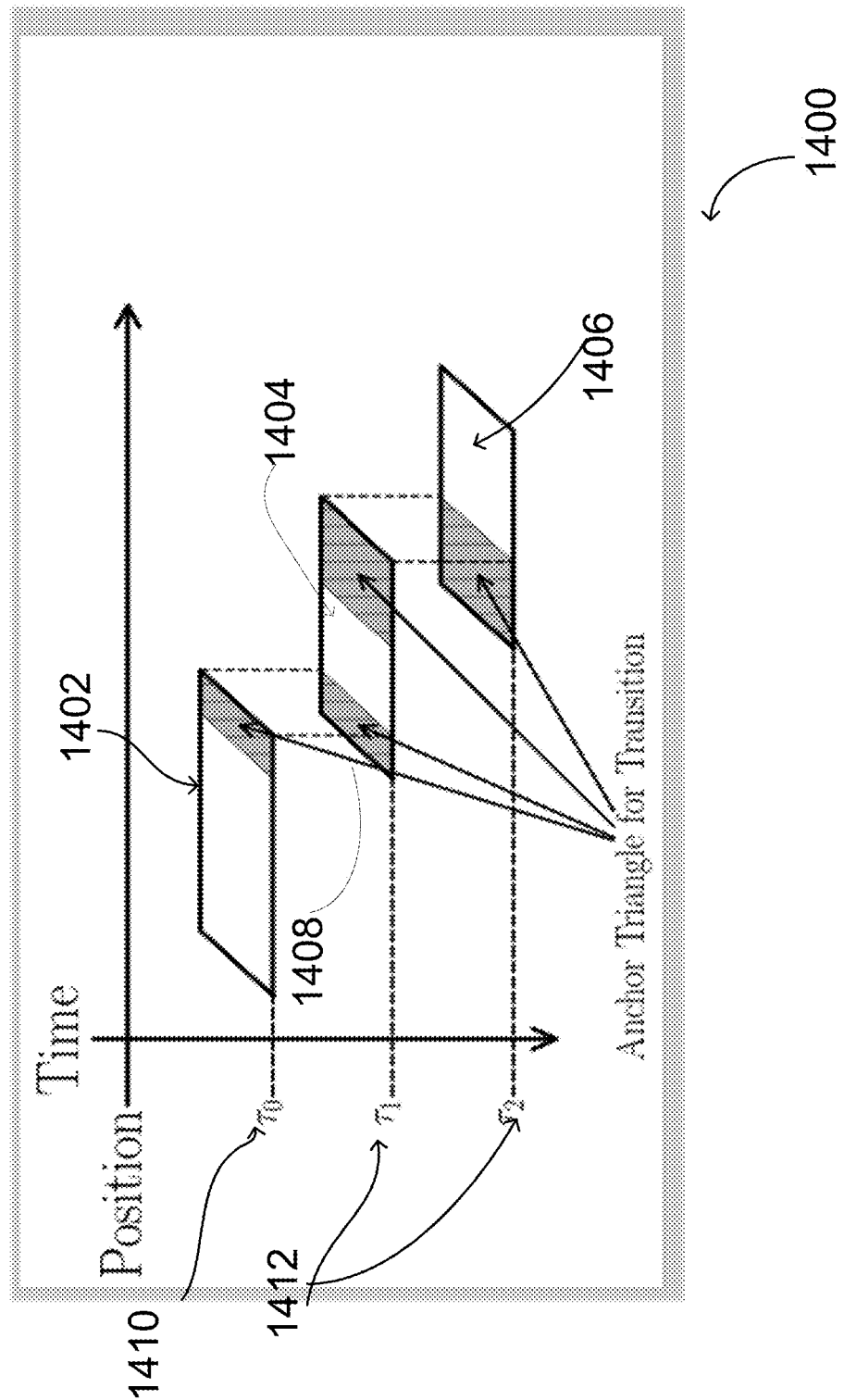
FIG. 14 is a conceptual illustration of a plurality of valid channel segments resulting from two topological events in accordance with an example embodiment of the present disclosure.

FIG. 14 is a conceptual diagram of a channel C 1400 that comprises a plurality of valid channel segments in accordance with one example embodiment of the present disclosure. The valid channel segments 1402, 1404, and 1406 result from two dynamic nodes violating the mesh structure of the channel at time 1412. Each valid channel segment overlaps 1408 with at least one other valid channel segment 1408 for transitioning. For example, an anchor triangle of a first valid channel segment 1402 overlaps with the first triangle of a second channel segment 1404 at 1408. A vehicle starting time, denoted as $t_0$, as seen at 1410.

Figure 15:
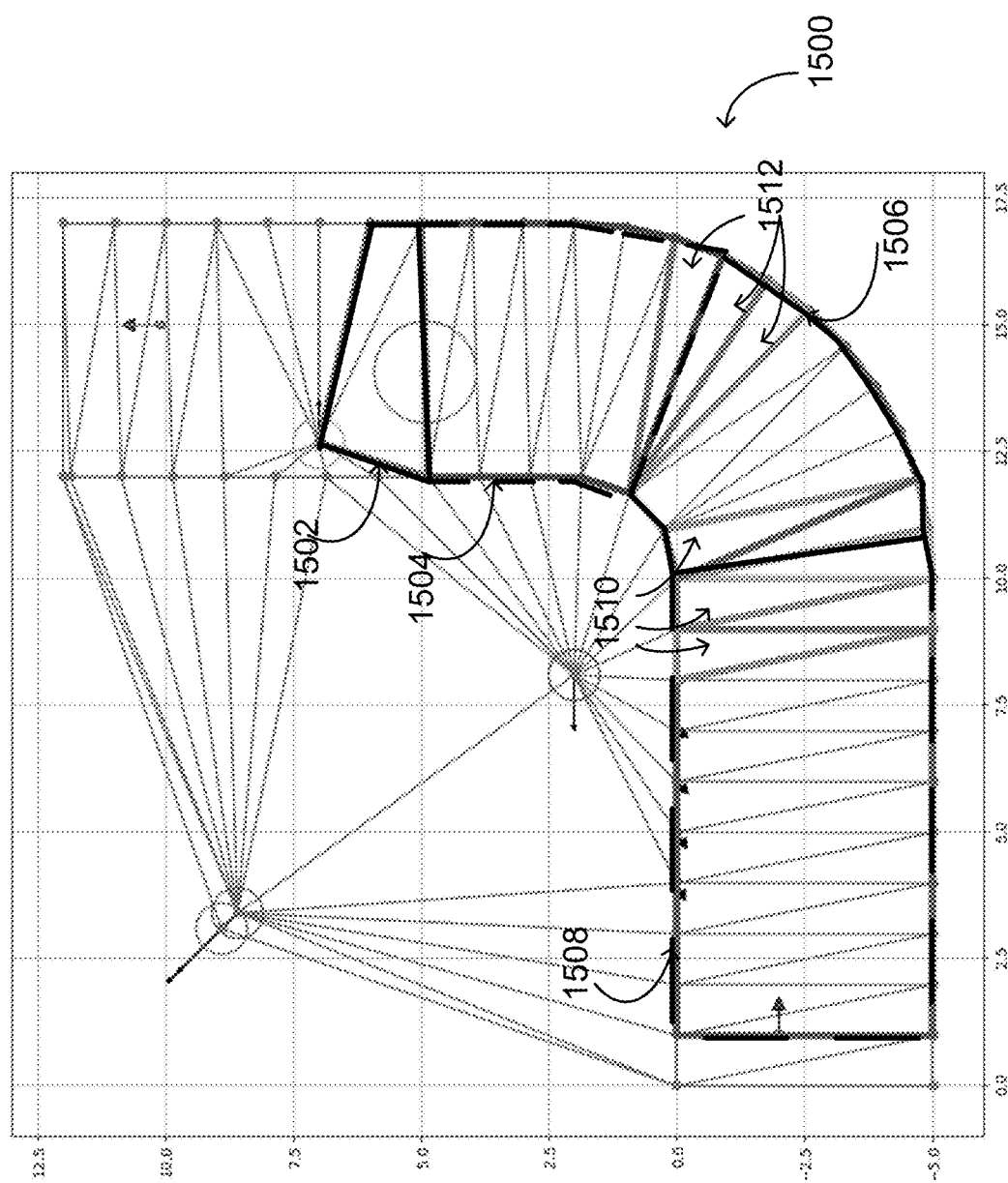
FIG. 15 shows an example of a generated plurality of valid channel segments in accordance with an example embodiment of the present disclosure.
Figure 16:
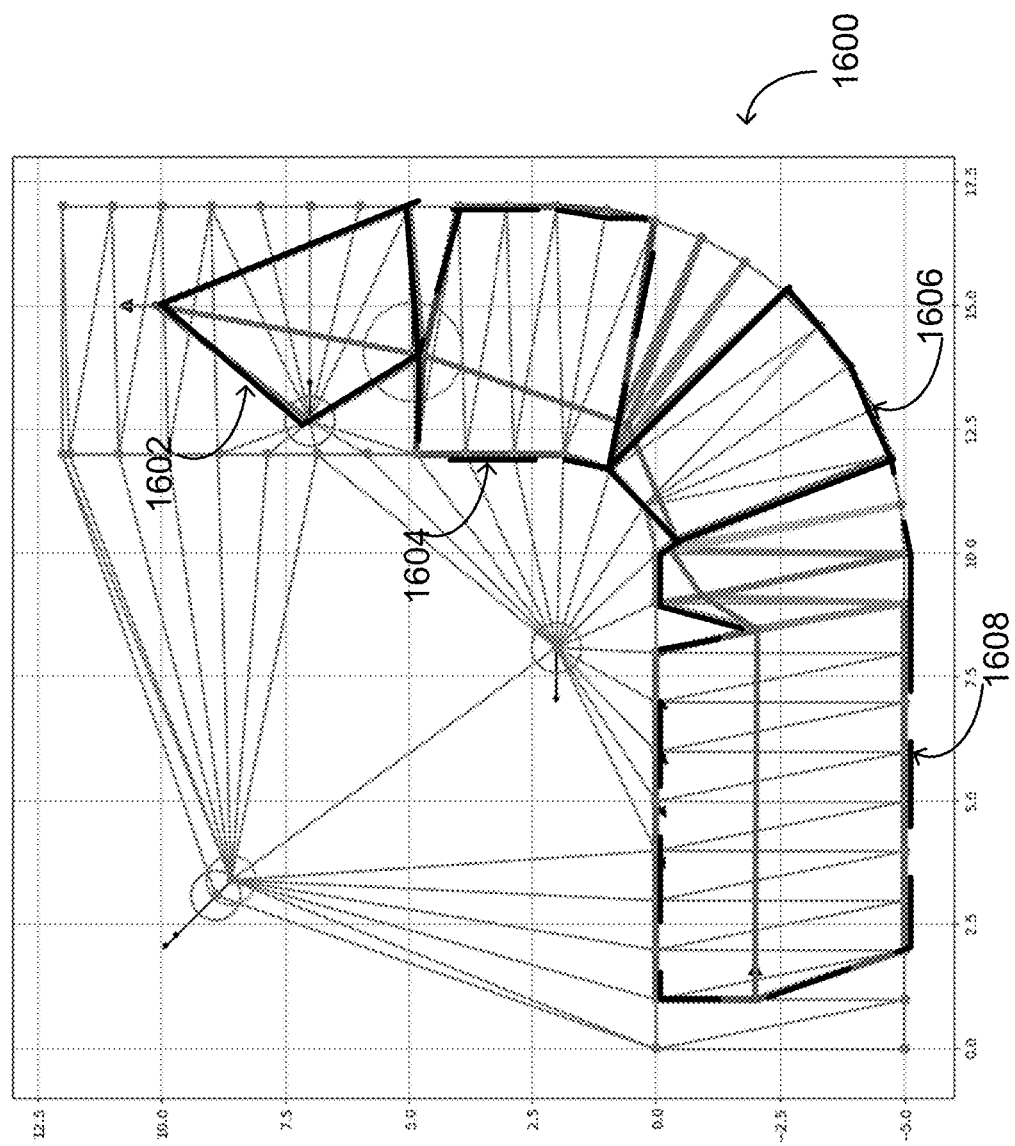
FIG. 16 shows another example of a generated plurality of valid channel segments in accordance with an example embodiment of the present disclosure.

FIG. 15 presents a set 1500 of valid channel segments in accordance with one example embodiment of the present disclosure. The valid channel segments $c'_i$ include valid channel segments 1502, 1504, 1506, and 1508. FIG. 15 also shows anchor triangles representing the common areas for transitioning between consecutive, valid channel segments at 1510 and 1512. FIG. 16 presents another set 1600 of valid channel segments (1602, 1604, 1606, and 1608) constructing a channel from a starting location to a target location.

Figure 17:
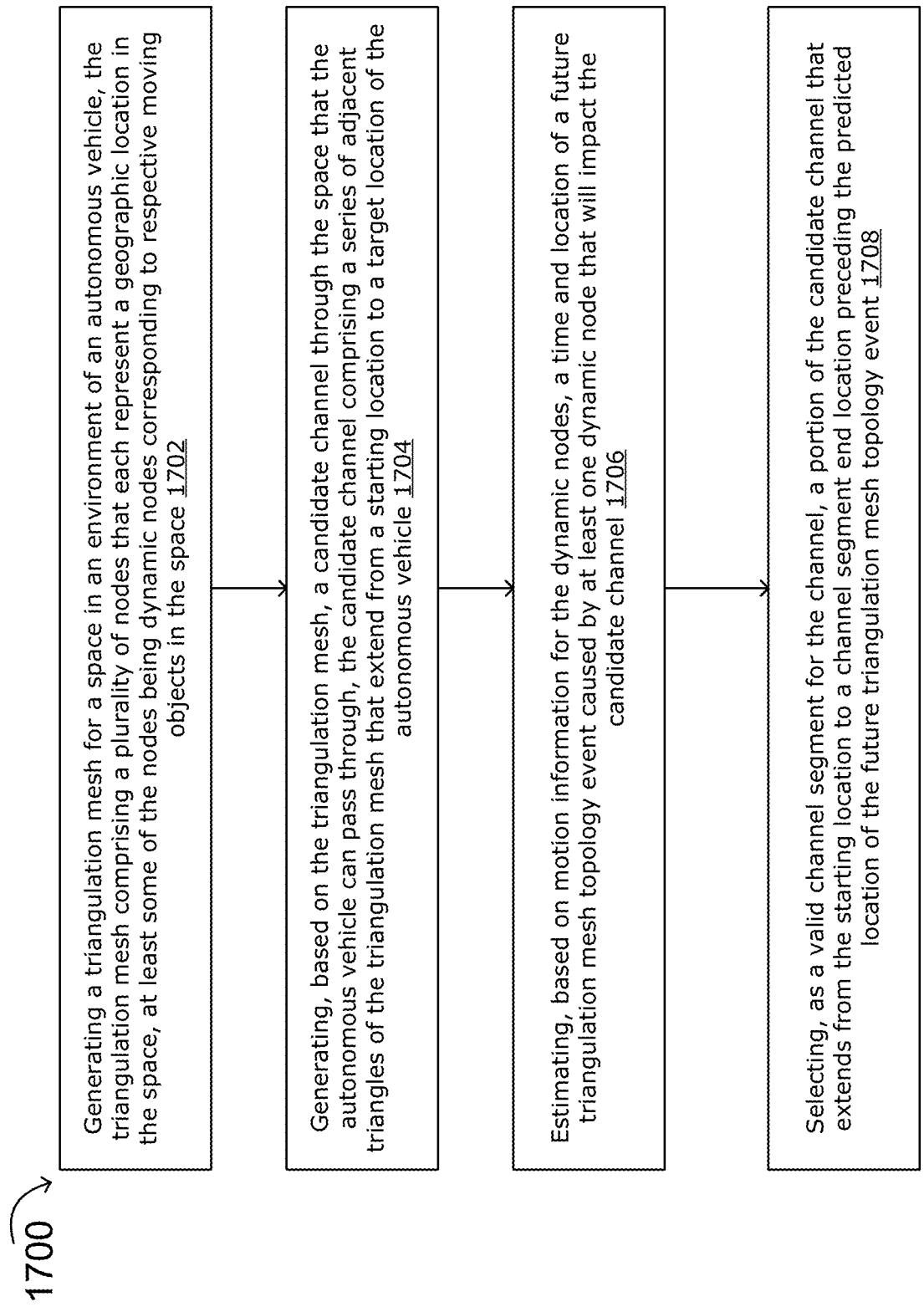
FIG. 17 is another flowchart of a method for generating a channel for an autonomous vehicle in accordance with an example embodiment of the present disclosure.

FIG. 17 is another flowchart for generating a channel that is used as spatial or spatio-temporal constraints for motion planning for an autonomous vehicle. The method 1700 begins at step 1702 at which the processor 210 performing the method 1700 generates a triangulation mesh for a space in an environment of an autonomous vehicle. The triangulation mesh includes a plurality of nodes that each represent a geographic location in the space at a given time. Some of the nodes correspond to moving objects in the space while other nodes correspond to static objects in the space such as trees, curb, parked car, road lane boundaries, road edges, road intersections, parking lot boundaries and the like.

After completing step 1702, 1704 begins. At step 1704, method 1700 generates, based on the triangulation mesh, a candidate channel through the space that the autonomous vehicle can pass through. This candidate channel comprises a series of adjacent triangles of the triangulation mesh that extend from a starting location to a target location of the autonomous vehicle. Method 1700 then proceeds to step 1706.

At step 1706, method 1700 predicts, based on motion information for the nodes corresponding to dynamic objects, a time and location of a future triangulation mesh topology event caused by at least one of the nodes that will impact the candidate channel. If no triangulation mesh topology event occurs, the candidate channel becomes the channel for the autonomous vehicle to pass through. Method 1700 then proceeds to step 1708.

At step 1708, method 1700 selects, as a valid channel segment for the channel, these segments are collision-free channels. Each segment is a portion of the candidate channel that extends from the starting location to a channel segment end location preceding the predicted location of the future triangulation mesh topology event. The method 1700 generates the channel by iterating steps 1706-1708 to generate the channel which includes a sequence of the valid channel segments from the starting location of the vehicle 100 to the target location for the vehicle 100. In the present disclosure, the term "predicting a location of a node" means generating a prediction of a location of a node in the future or estimating a location of a node in the future. The term "predicting a location of the autonomous vehicle" means generating a prediction of a location of the autonomous vehicle in the future or estimating a location of the autonomous vehicle in the future.

Figure 18:
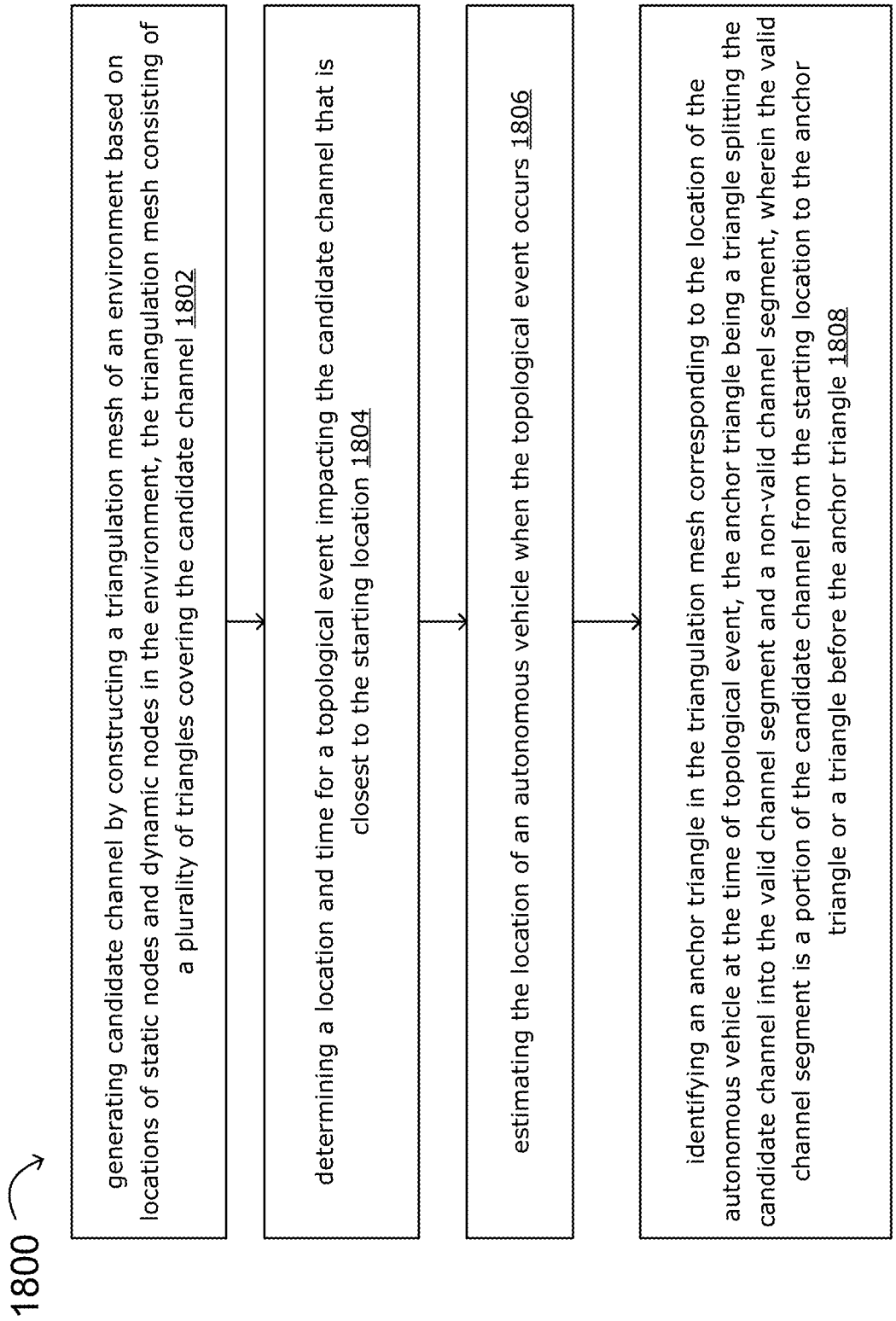
FIG. 18 is a flowchart of a method for motion planning in accordance with an example embodiment of the present disclosure.

FIG. 18 is a method 1800 for motion planning. The method 1800 begins at step 1802, where a candidate channel is generated by constructing a triangulation mesh of an environment based on locations based on locations of static nodes and dynamic nodes. The triangulation mesh consists of a plurality of triangles covering the candidate channel. Step 1802 ends and step 1804 begins. From step 1804 to step 1808, the processor 210 identifies valid channel segments within the candidate channel and generates a channel comprising the identified sequence of valid channel segments where the generated channel is used as spatial or spatio-temporal constraints for motion planning for an autonomous vehicle. The valid channel segments extends from a starting location of the autonomous vehicle to a target location of the autonomous vehicle. At step 1804, to identify each valid channel segment, the processor 210 performing the method 1800 determines a location and time for a topological event impacting the candidate channel that is closest to the starting location of the autonomous vehicle. The method 1800 then proceeds to step 1806.

At step 1806, the processor 210 performing the method 1800 predicts the location of the autonomous vehicle when the topological event occurs. Step 1806 ends, and step 1808 begins. At step 1808, the processor 210 performing the method 1800 identifies an anchor triangle in the triangulation mesh, which corresponds to the location of the autonomous vehicle at the time of topological event. The anchor triangle is a triangle splitting the candidate channel into the valid channel segment and a non-valid channel segment, wherein the valid channel segment is a portion of the candidate channel from the starting location to the anchor triangle or a triangle before the anchor triangle.

The coding of software and software modules for carrying out the above-described methods described is within the scope of a person of ordinary skill in the art having regard to the present disclosure. Executable instructions of software code or and software modules for execution by one or more processors of one or more respective devices to perform the above-described method may be stored in a machine-readable medium as the memory of the autonomous vehicle control system. The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified. Although the processor 210 is described as performing many of the operations, one or more dedicated digital signal processors (DSPs), graphical processing units (GPU), or image processors may be used to perform some of the described operations. The particular processing entity that performs the described operations is not intended to be restrictive to the present disclosure.

In example embodiments, a path generated by mission planning 310 may be used by the channel generator 304 to identify the valid channel segments.

In at least some examples, one or more of the systems and modules are implemented using artificial intelligence components such as neural networks that have been trained using machine learning to perform the operations and functions described above.

Although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for generating a channel for use as spatial or spatio-temporal constraints for motion planning for an autonomous vehicle, the method comprising:

generating a triangulation mesh for a space in an environment of the autonomous vehicle, the triangulation mesh comprising a plurality of nodes that each represent a geographic location in the space at a given time, at least some of the nodes corresponding to moving objects in the space;

for each respective node corresponding to a moving object, projecting a velocity of the moving object onto edges of one or more neighboring nodes of the respective node, wherein the projection of the velocity of each respective node corresponding to a moving object is a function of a velocity value, a distance penalty, and an angular penalty, wherein a value of the projection of each one of the edges is the vector multiplication between the velocity value of the node and a direction of each one of the edges multiplied by the angular penalty and the distance penalty, computed separately for each edge, wherein the distance penalty is computed as distance penalty=$\alpha/\|i-j\|+\alpha'$ wherein $\alpha$ is a distance penalty factor, $\|i-j\|$ is the Euclidean distance between i and j, wherein i and j are the coordinates of one of the nodes corresponding to a moving object and a point of interest;

generating, based on the triangulation mesh, a candidate channel through the space that the autonomous vehicle can pass through, the candidate channel comprising a series of adjacent triangles of the triangulation mesh that extend from a starting location to a target location of the autonomous vehicle;

generating the channel by iteratively:
predicting, based on motion information for the dynamic nodes, a time and location of a future triangulation mesh topology event caused by at least one of the nodes that will impact the candidate channel; and selecting, as a valid channel segment for the channel, a portion of the candidate channel that extends from the starting location to a channel segment end location preceding the predicted location of the future triangulation mesh topology event; and providing the channel for motion planning for the autonomous vehicle.

2. The method of claim 1 wherein selecting the portion of the candidate channel comprises:
predicting a location for the autonomous vehicle in the candidate channel for the time of the future triangulation mesh topology event;
determining an anchor triangle from the candidate channel based on the predicted location of the autonomous vehicle; and
wherein the channel segment end location is the anchor triangle.

3. The method of claim 2 wherein
the anchor triangle corresponds to the predicted location of the autonomous vehicle when the predicted location of the autonomous vehicle is located at a triangle preceding the predicted location of the future triangulation mesh topology event; and
the anchor triangle corresponds to a triangle immediately preceding a triangle that corresponds to the predicted location of the autonomous vehicle when the predicted location of the autonomous vehicle is located at the predicted location of the future triangulation mesh topology event.

4. The method of claim 1, further comprising generating virtual static nodes and including the virtual static nodes in the triangulation mesh to limit the space to a region for which the channel can be generated.

5. The method of claim 1 wherein the candidate channel is generated using a graph search method of at least one or more of Anytime A*, D* lite, or Timed A*.

6. A computer-implemented method for motion planning, comprising:
generating a candidate channel by constructing a triangulation mesh representing an environment based on locations of static objects and dynamic objects in the environment, the triangulation mesh consisting of a plurality of triangles covering the candidate channel, each triangle comprising three nodes, each node corresponding to one of the static or dynamic objects;
for each respective node corresponding to a dynamic object, projecting a velocity of the dynamic object onto edges of one or more neighboring nodes of the respective node, wherein the projection of the velocity of each respective node corresponding to a dynamic object is a function of a velocity value, a distance penalty, and an angular penalty, wherein a value of the projection of each one of the edges is the vector multiplication between the velocity value of the node and a direction of each one of the edges multiplied by the angular penalty and the distance penalty, computed separately for each edge, wherein the distance penalty is computed as $$\text{distance penalty} = \frac{\alpha}{\|i-j\|+\alpha},$$

wherein $\alpha$ is a distance penalty factor, $\|i-j\|$ is the Euclidean distance between i and j, wherein i and j are the coordinates of one of the nodes corresponding to a dynamic object and a point of interest; and identifying a sequence of valid channel segments within the candidate channel, the sequence valid channel segments extending from a starting location of the autonomous vehicle to a target location of the autonomous vehicle, and generating a channel comprising the identified sequence of valid channel segments, wherein each valid channel segment is identified by:
determining a location and time for a topological event impacting the candidate channel that is closest to the starting location;
predicting the location of the autonomous vehicle when the topological event occurs; and
identifying an anchor triangle in the triangulation mesh corresponding to the location of the autonomous vehicle at the time of topological event, the anchor triangle being a triangle splitting the candidate channel into the valid channel segment and a non-valid channel segment, wherein the valid channel segment is a portion of the candidate channel from the starting location to the anchor triangle or a triangle before the anchor triangle; and motion planning for an autonomous vehicle using at least the channel as spatial or spatio-temporal constraints.

7. The method of claim 6, wherein the angular penalty is computed as $$\text{angular penalty} = \left(1 - \frac{\theta}{\pi}\right)^\beta,$$

wherein $\theta$ is the angle between each one edge of the node corresponding to a dynamic object and the direction of the node, and $\beta$ is an angular penalty factor.

8. The method of claim 6, comprising generating a plurality of evenly spaced virtual static nodes for the candidate channel, and placing the plurality of evenly spaced virtual static nodes on a perimeter of the candidate channel and reconstructing the triangulation mesh.

9. The method of claim 6, wherein the topological events are determined by predicting locations of the nodes corresponding to the dynamic objects at points in time, and computing if any one of the nodes corresponding to a dynamic object at the points in time causes a triangulation mesh violation to any one of the triangles in the triangulation mesh of the candidate channel, wherein the points in time when violations occur are the times of topological events.

10. The method of claim 6, wherein the triangulation mesh is constructed using at least one of Delaunay triangulation or constrained Delaunay triangulation.

11. The method of claim 6, wherein the locations of the nodes corresponding to the dynamic objects are predicted using at least one of mathematical models including linear or non-linear models; statistical models including Kalman filters, particle filters, or regression; or machine learning-based models including support vector machine for regression, decision trees, distributional learning, variational inference, and a neural network.

12. A computing system for motion planning for an autonomous vehicle, the computing system comprising:
  a processor;
  a memory coupled to the processor, the memory tangibly storing thereon executable instructions that, when executed by the processor, cause the processor to:
    generate a candidate channel by constructing a triangulation mesh representing an environment based on locations of static nodes and dynamic nodes in the environment, the triangulation mesh consisting of a plurality of triangles covering the candidate channel;
    for each respective node corresponding to a dynamic object, project a velocity of the dynamic object onto edges of one or more neighboring nodes of the respective node, wherein the projection of the velocity of each respective node corresponding to a dynamic object is a function of a velocity value, a distance penalty, and an angular penalty,
      wherein a value of the projection of each one of the edges is the vector multiplication between the velocity value of the node and a direction of each one of the edges multiplied by the angular penalty and the distance penalty, computed separately for each edge,
      wherein the distance penalty is computed as distance penalty=$\alpha/\|i-j\|+\alpha'$ wherein $\alpha$ is a distance penalty factor, $\|i-j\|$ is the Euclidean distance between i and j, wherein i and j are the coordinates of one of the nodes corresponding to a dynamic object and a point of interest; and
    identify valid channel segments within the candidate channel for use as spatial or spatio-temporal constrains for the autonomous vehicle, the valid channel segments extending from a starting location of the autonomous vehicle to a target location of the autonomous vehicle, and generating a channel comprising the identified sequence of valid channel segments, wherein each valid channel segment is identified by:
    determining a location and time for a topological event impacting the candidate channel that is closest to the starting location;
    estimating the location of the autonomous vehicle when the topological event occurs;
    identifying an anchor triangle in the triangulation mesh corresponding to the location of the autonomous vehicle at the time of topological event, the anchor triangle being a triangle splitting the candidate channel into the valid channel segment and a non-valid channel segment, wherein the valid channel segment is a portion of the candidate channel from the starting location to the anchor triangle or a triangle before the anchor triangle; and
    motion planning for an autonomous vehicle using at least the channel as spatial or spatio-temporal constraints.

13. The computing system of claim 12, comprising generating a plurality of evenly spaced virtual static nodes for the candidate channel, and placing the plurality of evenly spaced virtual static nodes on a perimeter of the candidate channel and reconstructing the triangulation mesh.

14. The computing system of claim 12, wherein the topological events are determined by estimating locations of the nodes corresponding to the dynamic objects at points in time, and computing if any one of the nodes corresponding to a dynamic object at the points in time causes a triangulation mesh violation to any one of the triangles in the triangulation mesh of the candidate channel, wherein the points in time when violations occur are the times of topological events.

15. The computing system of claim 12, wherein the triangulation mesh is constructed using at least one of Delaunay triangulation or constrained Delaunay triangulation.

16. The computing system of claim 12, wherein the angular penalty is computed as angular penalty=$(1-\theta/\pi)^\beta$, wherein $\theta$ is the angle between each one edge of the node corresponding to a dynamic object and the direction of the node, and $\beta$ is an angular penalty factor.

17. A computer-implemented method for generating a channel for use as spatial or spatio-temporal constraints for motion planning for an autonomous vehicle, the method comprising:
  generating a triangulation mesh for a space in an environment of the autonomous vehicle, the triangulation mesh comprising a plurality of nodes that each represent a geographic location in the space at a given time, at least some of the nodes corresponding to moving objects in the space;
  for each respective node corresponding to a moving object, projecting a velocity of the moving object onto edges of one or more neighboring nodes of the respective node, wherein the projection of the velocity of each respective node corresponding to a moving object is a function of a velocity value, a distance penalty, and an angular penalty,
    wherein a value of the projection of each one of the edges is the vector multiplication between the velocity value of the node and a direction of each one of the edges multiplied by the angular penalty and the distance penalty, computed separately for each edge,
    wherein the angular penalty is computed as angular penalty=$(1-\theta/\pi)^\beta$, wherein $\theta$ is the angle between each one edge of the node corresponding to a dynamic object and the direction of the node, and $\beta$ is an angular penalty factor;
  generating, based on the triangulation mesh, a candidate channel through the space that the autonomous vehicle can pass through, the candidate channel comprising a series of adjacent triangles of the triangulation mesh that extend from a starting location to a target location of the autonomous vehicle;
  generating the channel by iteratively:
    predicting, based on motion information for the dynamic nodes, a time and location of a future triangulation mesh topology event caused by at least one of the nodes that will impact the candidate channel; and
    selecting, as a valid channel segment for the channel, a portion of the candidate channel that extends from the starting location to a channel segment end location preceding the predicted location of the future triangulation mesh topology event; and providing the channel for motion planning for the autonomous vehicle.

\* \* \* \* \*

UNITED STATES PATENT AND TRADEMARK OFFICE
CERTIFICATE OF CORRECTION

PATENT NO. : 11,873,004 B2
APPLICATION NO. : 17/515522
DATED : January 16, 2024
INVENTOR(S) : Han Hu and Peyman Yadmellat It is certified that error appears in the above-identified patent and that said Letters Patent is hereby corrected as shown below:

In the Specification

The equation found Column 13, Line 15 should read:

-- $\{C: C = \cup_{i=1}^{n} c_i'\}$ --

Column 13, Lines 28-29:
"and retain a valid channel segment $c_{i+1}$' as the next channel segment in channel C, where $c_{i+1}$' is from the expected"

Should read:

-- and retain a valid channel segment $c'_{i+1}$ as the next channel segment in channel C, where $c'_{i+1}$ is from the expected --

Equation (1) found at Column 15, Line 35 should read:

-- $v'_{new} = \max\left(v'_{old}, \left(\frac{\alpha}{\|p\| + \alpha}\right)\left(1 - 2\frac{\theta}{\pi}\right)^{\beta} v_{src}\right)$ --

Column 15, Line 65:
"present disclosure. The parameters a and 8 control the"

Should read:
-- present disclosure. The parameters α and β control the --

Signed and Sealed this
Nineteenth Day of March, 2024

Katherine Kelly Vidal
*Director of the United States Patent and Trademark Office*